United States Patent
Lee et al.

(10) Patent No.: US 11,637,498 B2
(45) Date of Patent: *Apr. 25, 2023

(54) MULTI-PHASE SWITCHING REGULATOR INCLUDING INTERLEAVING CIRCUIT AND SWITCHING REGULATING METHOD USING THE SAME

(71) Applicant: SAMSUNG ELECTRONICS CO., LTD., Suwon-si (KR)

(72) Inventors: Sun-Kyu Lee, Suwon-si (KR); Nguyen Huyhieu, Suwon-si (KR); Dong-Jin Keum, Seoul (KR); Je-Hyung Yoon, Seoul (KR); Hee-Seok Han, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/467,388

(22) Filed: Sep. 6, 2021

(65) Prior Publication Data

US 2021/0399641 A1 Dec. 23, 2021

Related U.S. Application Data

(63) Continuation of application No. 16/540,249, filed on Aug. 14, 2019, now Pat. No. 11,152,860.

(30) Foreign Application Priority Data

Oct. 10, 2018 (KR) .......................... 10-2018-0120594

(51) Int. Cl.
*H02M 3/158* (2006.01)
*H02M 1/08* (2006.01)
*H02M 1/00* (2006.01)

(52) U.S. Cl.
CPC .......... *H02M 3/1584* (2013.01); *H02M 1/08* (2013.01); *H02M 3/158* (2013.01);
(Continued)

(58) Field of Classification Search
None
See application file for complete search history.

(56) References Cited

U.S. PATENT DOCUMENTS 6,278,263 B1    8/2001   Walters et al.
7,053,713 B1 *  5/2006   Dening ................. H03F 1/0227
                                                                    330/276

(Continued)

FOREIGN PATENT DOCUMENTS

FR            3002706 A1 *  8/2014  .............. H02M 1/14

*Primary Examiner* — Matthew V Nguyen
(74) *Attorney, Agent, or Firm* — Volentine, Whitt & Francos, PLLC

(57) ABSTRACT

A multi-phase switching regulator and a switching regulating method using the multi-phase switching regulator employ an interleaving circuit. The multi-phase switching regulator includes: a first regulating circuit configured to receive an input voltage and generate a first sub-output voltage with a first phase by transforming the input voltage in response to a first set signal; a second regulating circuit configured to receive the input voltage and generate a second sub-output voltage with a second phase by transforming the input voltage in response to a second set signal; and the interleaving circuit configured to repeatedly and sequentially generate the first set signal and the second set signal by comparing a reference voltage with an output voltage generated based on the first sub-output voltage and the second sub-output voltage.

20 Claims, 21 Drawing Sheets

(52) U.S. Cl.
CPC ........ *H02M 1/0003* (2021.05); *H02M 1/0009* (2021.05); *H02M 3/1586* (2021.05)

(56) References Cited

U.S. PATENT DOCUMENTS

| | | | |
|---|---|---|---|
| 7,759,918 B2 | 7/2010 | Moyer et al. | |
| 8,358,113 B2 | 1/2013 | Cheng et al. | |
| 8,405,368 B2 | 3/2013 | Laur et al. | |
| 8,917,077 B2* | 12/2014 | Lin .................... | H02M 3/1584 323/285 |
| 9,293,993 B1 | 3/2016 | Shehu | |
| 9,698,692 B2 | 7/2017 | Jang et al. | |
| 9,712,059 B2 | 7/2017 | Fan | |
| 10,778,101 B1* | 9/2020 | Schmitz .............. | H02M 3/1584 |
| 2009/0174262 A1 | 7/2009 | Martin et al. | |
| 2013/0057237 A1 | 3/2013 | Chen et al. | |
| 2013/0169249 A1* | 7/2013 | Lee .................... | H02M 3/1584 323/272 |
| 2014/0253063 A1* | 9/2014 | Sreenivas ........... | H02M 3/1584 323/271 |
| 2017/0060205 A1 | 3/2017 | Bharath et al. | |
| 2019/0074770 A1 | 3/2019 | Trichy et al. | |
| 2019/0273439 A1 | 9/2019 | Desai et al. | |
| 2020/0021189 A1* | 1/2020 | Li ........................ | H02M 3/158 |
| 2022/0286053 A1* | 9/2022 | Agrawal ............... | H02M 1/327 |

\* cited by examiner

MULTI-PHASE SWITCHING REGULATOR INCLUDING INTERLEAVING CIRCUIT AND SWITCHING REGULATING METHOD USING THE SAME

CROSS-REFERENCE TO RELATED APPLICATION

This is a Continuation of U.S. application Ser. No. 16/540,249, filed Aug. 14, 2019, which issued as U.S. Pat. No. 11,152,860 on Oct. 19, 2021, and a claim of priority is made to Korean Patent Application No. 10-2018-0120594, filed on Oct. 10, 2018, in the Korean Intellectual Property Office, the disclosures of which are incorporated herein in their entireties by reference.

BACKGROUND

The inventive concept relates to a switching regulator, and more particularly, to a switching regulator generating a sub-output voltage at regulator intervals based on a set signal received from an independent interleaving circuit and to a switching regulating method using the switching regulator.

Switching regulators include devices generating output voltages from input voltages by switching between turning-on and turning-off elements of the devices. Switching regulators may provide high power efficiency and various output voltages and are used to generate power supply voltages of components in various systems. Examples of switching regulators include direct current (DC)-DC converters stepping up or down input DC voltages and the like.

Switching regulators may be implemented as multi-phase switching regulators generating output voltages by superimposing sub-output voltages having multiple phases and generated from a plurality of regulating circuits, respectively. Since sub-output voltages with multiple phases may have different phases from each other, and an output voltage may vary with changes in phase differences between the sub-output voltages, research continues to be carried out for maintaining the phase differences between sub-output voltages constant in switching regulators.

SUMMARY

The inventive concept provides a switching regulator maintaining phase differences between sub-output voltages with multiple phases constant and a switching regulating method using the switching regulator.

The inventive concept also provides a switching regulator compensating for current differences between a plurality of regulating circuits and a switching regulating method using the switching regulator.

According to an aspect of the inventive concept, there is provided a multi-phase switching regulator, which may include: a first regulating circuit configured to receive an input voltage and to generate a first sub-output voltage with a first phase by transforming the input voltage in response to a first set signal; a second regulating circuit configured to receive the input voltage and to generate a second sub-output voltage with a second phase by transforming the input voltage in response to a second set signal; and an interleaving circuit configured to generate repeatedly and sequentially the first set signal and the second set signal by comparing a reference voltage with an output voltage generated based on the first sub-output voltage and the second sub-output voltage.

According to another aspect of the inventive concept, there is provided a multi-phase switching regulator, which may include: a first regulating circuit configured to receive an input voltage and to output a first sub-output voltage with a first phase to a first output node by transforming the input voltage; a second regulating circuit configured to receive the input voltage and to output a second sub-output voltage with a second phase to a second output node by transforming the input voltage; a first current sensor configured to sense a first current flowing in the first output node; a second current sensor configured to sense a second current flowing in the second output node; and a first current balancer configured to receive the first current and the second current and output a first current control signal to the second regulating circuit based on a first sensing value of the first current and a second sensing value of the second current, wherein the second regulating circuit is configured to adjust a second current level of the second current to be equal to a first current level of the first current.

According to yet another aspect of the inventive concept, there is provided a switching regulating method, which may include: receiving an input voltage; generating a first sub-output voltage with a first phase by transforming the input voltage in response to a first set signal; generating a second sub-output voltage with a second phase by transforming the input voltage in response to a second set signal; generating an output voltage by superimposing the first sub-output voltage and the second sub-output voltage on each other; comparing the output voltage with a reference voltage; and repeatedly and sequentially outputting the first set signal and the second signal based on a result of the comparison between the output voltage and the reference voltage.

According to still another aspect of the invention, a device comprises: a plurality of individual regulating circuits each configured to receive a same input voltage as each other and configured to generate a corresponding plurality of individual sub-output voltages in response to a corresponding plurality of individual set signals; a voltage combination circuit configured to receive the plurality of individual sub-output voltages and in response thereto to produce an output voltage; and an interleaving circuit configured to generate repeatedly and sequentially the plurality of individual set signals by comparing the output voltage with a reference voltage.

BRIEF DESCRIPTION OF THE DRAWINGS

Embodiments of the inventive concept will be more clearly understood from the following detailed description taken in conjunction with the accompanying drawings.

DETAILED DESCRIPTION OF THE EMBODIMENTS

Figure 1:
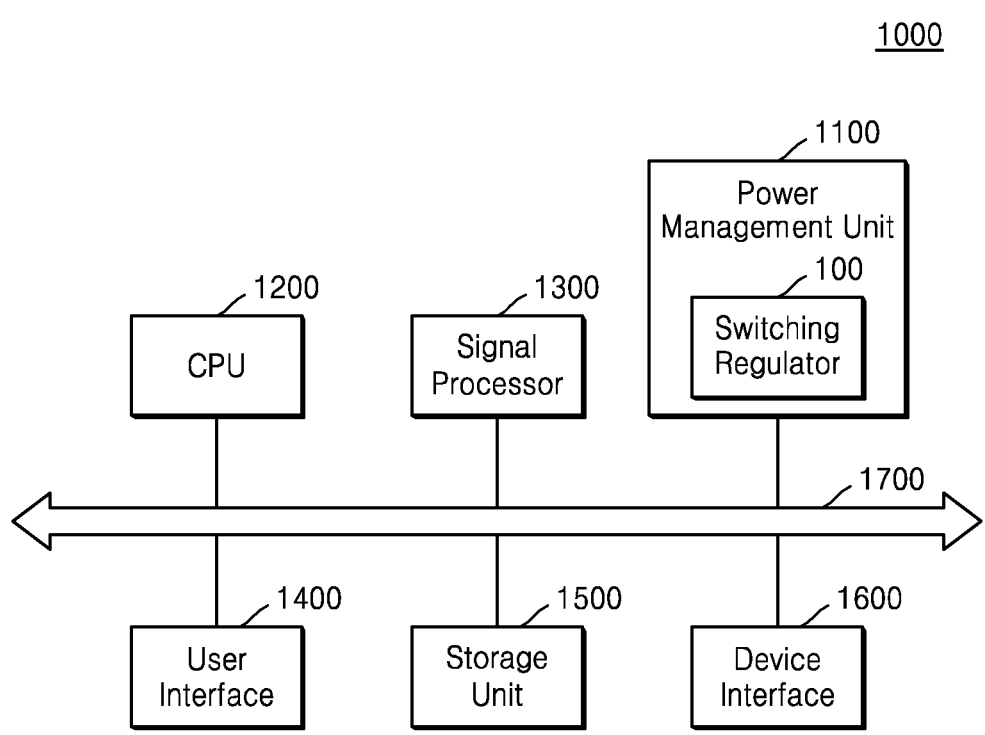
FIG. 1 is a block diagram illustrating an example embodiment of an electronic device.

FIG. 1 is a block diagram illustrating an example embodiment of an electronic device.

Referring to FIG. 1, an electronic device 1000 may include a power management unit 1100, a central processing unit (CPU) 1200, a signal processor 1300, a user interface 1400, a storage unit 1500, a device interface 1600, and a bus 1700.

Examples of electronic device 1000 may include computers, mobile phones, personal digital assistants (PDAs), portable multimedia players (PMPs), MP3 players, cameras, camcorders, television (TV) sets, display devices, and the like. Power management unit 1100 may generate a power supply voltage needed by electronic device 1000 and supply the power supply voltage to respective components of electronic device 1000.

Power management unit 1100 may include a switching regulator 100, and switching regulator 100 may function as a direct current (DC)-DC converter. Switching regulator 100 may include a multi-phase switching regulator generating an output voltage by superimposing two or more sub-output voltages having different phases from each other. According to an embodiment, switching regulator 100 may include an interleaving circuit, and phases of a plurality of sub-output voltages may be respectively determined according to a plurality of set signals received from the interleaving circuit. Thus, phase differences between the plurality of sub-output voltages may be maintained constant over time. This will be described below in detail with reference to FIG. 2.

CPU 1200 may perform overall control of electronic device 1000. As an example, CPU 1200 may control components of electronic device 1000 based on information that is input via user interface 1400. Signal processor 1300 may process signals received via device interface 1600 or signals read from storage unit 1500, in accordance with specified standards. As an example, signal processor 1300 may perform video signal processing, audio signal processing, or the like.

User interface 1400 may function as an input device for a user to set information needed for function setting and operations of electronic device 1000. Storage unit 1500 may store various pieces of information needed for the operations of electronic device 1000. In addition, storage unit 1500 may store data received via device interface 1600 or data processed by electronic device 1000. Device interface 1600 may perform data communication with external devices that are connected to electronic device 1000 from outside electronic device 1000 in a wired or wireless manner. Bus 1700 may perform a function of transferring information between the components of electronic device 1000.

Figure 2:
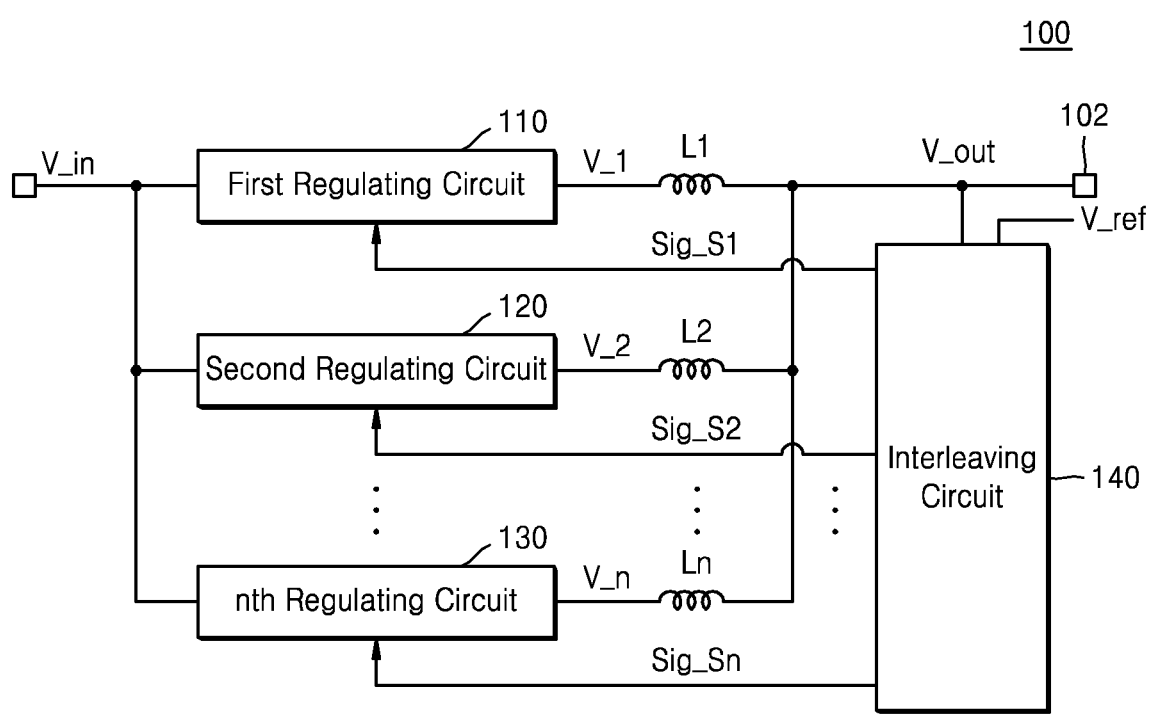
FIG. 2 is a block diagram illustrating an example embodiment of a switching regulator.

FIG. 2 is a block diagram illustrating an example embodiment of a switching regulator.

Referring to FIG. 2, switching regulator 100 may include first to n-th regulating circuits 110 to 130 (where n is a natural number), a voltage combination circuit comprising first to n-th inductors L1 to Ln, and an interleaving circuit 140.

First regulating circuit 110 may receive an input voltage V_in and may generate a first sub-output voltage V_1 with a first phase by transforming the input voltage V_in based on a first set signal Sig_S1 provided by interleaving circuit 140. Second regulating circuit 120 may receive the input voltage V_in and may generate a second sub-output voltage V_2 with a second phase by transforming the input voltage V_in based on a second set signal Sig_S2 provided by interleaving circuit 140. N-th regulating circuit 130 may receive the input voltage V_in and may generate an n-th sub-output voltage V_n with an n-th phase by transforming the input voltage V_in based on an n-th set signal Sig_Sn provided by interleaving circuit 140. The plurality of sub-output voltages V_1 to V_n may be combined by the voltage combination circuit to produce an output voltage V_out at an output node 102 of switching regulator 100. In particular, the plurality of sub-output voltages V_1 to V_n may be superimposed on each other after passing through a plurality of inductors L1 to Ln, and thus, the output voltage V_out may be generated.

A minimum phase difference between the sub-output voltages V_1 to V_n may be $2\pi/n$. In one example, when switching regulator 100 includes four regulating circuits in total, a phase difference between the first sub-output voltage V_1 and the second sub-output voltage V_2 may be $2\pi/4=\pi/2$, and a phase difference between the second sub-output voltage V_2 and a fourth sub-output voltage may be $2\pi/4*2=\pi$, for example Interleaving circuit 140 may sequentially output a plurality of set signals Sig_S1 to Sig_Sn based on the output voltage V_out. In one embodiment, interleaving circuit 140 may sequentially output the plurality of set signals Sig_S1 to Sig_Sn whenever the output voltage V_out reaches the same voltage level as a reference voltage V_ref. In addition, when the output voltage V_out reaches the same voltage level as the reference voltage V_ref after interleaving circuit 140 has output the n-th set signal Sig_Sn, interleaving circuit 140 may sequentially output the plurality of set signals Sig_S1 to Sig_Sn again, starting from the first set signal Sig_S1.

According to one or more embodiments, a plurality of regulating circuits 110 to 130 may respectively generate the plurality of sub-output voltages V_1 to V_n in response to the plurality of set signals Sig_S1 to Sig_Sn generated by interleaving circuit 140 based on the output voltage V_out, and since the plurality of set signals Sig_S1 to Sig_Sn are collectively managed by interleaving circuit 140, phase differences between the plurality of sub-output voltages V_1 to V_n may be maintained constant.

Figure 3:
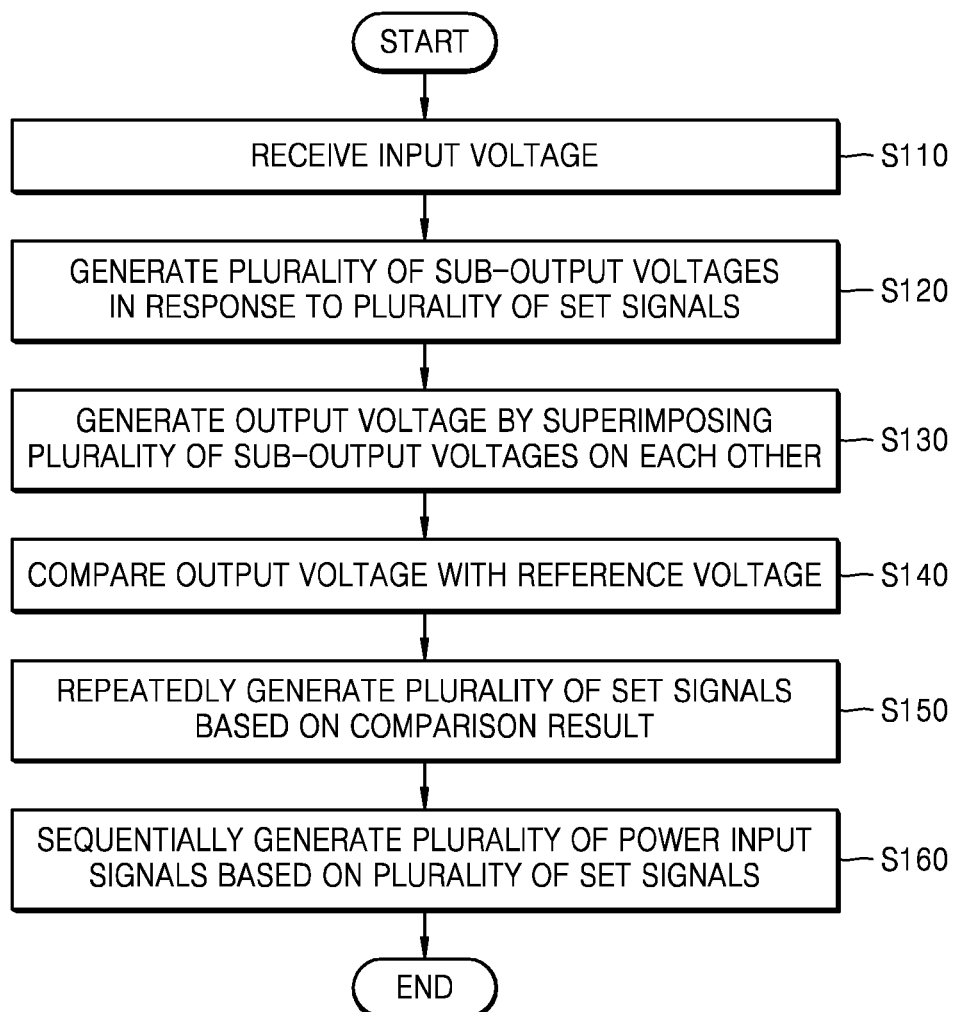
FIG. 3 is a flowchart illustrating an example embodiment of a method of operating a switching regulator.

FIG. 3 is a flowchart illustrating an example embodiment of a method of operating a switching regulator.

Referring to FIGS. 2 and 3, switching regulator 100 may receive the input voltage V_in (S110) and may generate the plurality of sub-output voltages V_1 to V_n having different phases from each other by transforming the input voltage V_in in response to the plurality of set signals Sig_S1 to Sig_Sn, respectively (S120). Switching regulator 100 may generate the output voltage V_out by superimposing the plurality of sub-output voltages V_1 to V_n, which are generated thereby, on each other, and may compare the output voltage V_out with the reference voltage V_ref (S140). Switching regulator 100 may repeatedly and sequentially generate the plurality of set signals Sig_S1 to Sig_Sn based on a result of the comparison between the output voltage V_out and the reference voltage V_ref (S150) and may sequentially generate a plurality of power input signals for the generation of the plurality of sub-output voltages V_1 to V_n based on the plurality of set signals Sig_S1 to Sig_Sn (S160). An example of the plurality of power input signals for the generation of the plurality of sub-output voltages V_1 to V_n will be described below with respect to FIG. 5.

Figure 4:
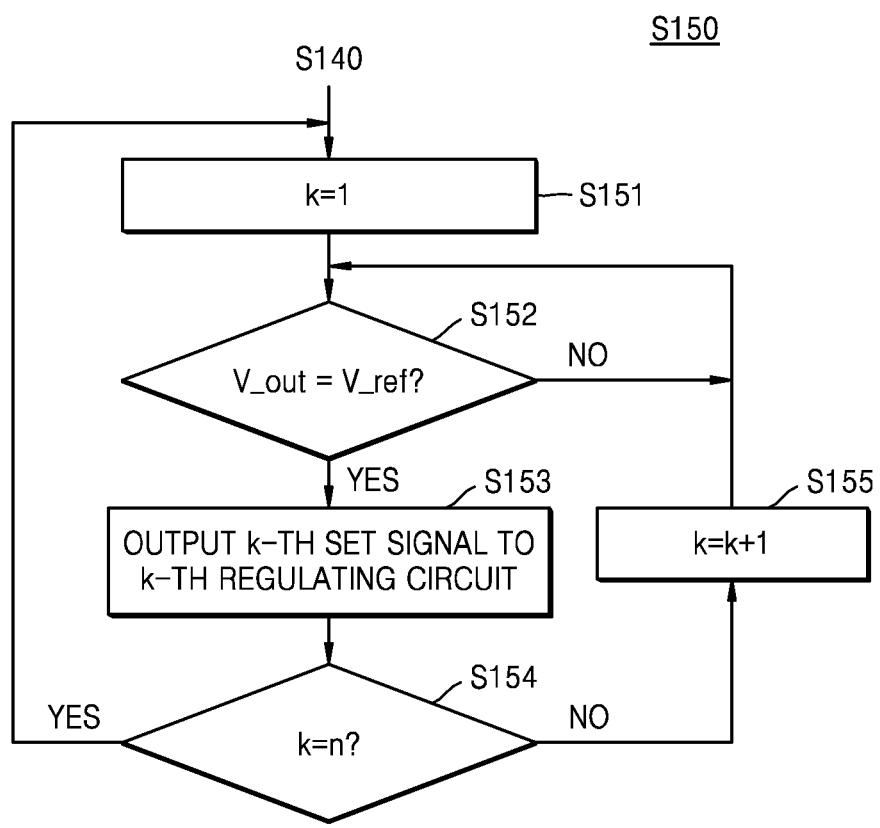
FIG. 4 is a flowchart illustrating an example embodiment of a method of operating an interleaving circuit.

FIG. 4 is a flowchart illustrating an example embodiment of a method of operating an interleaving circuit. In particular, FIG. 4 is a flowchart illustrating repeatedly generating a plurality of set signals (S150) in FIG. 3.

Referring to FIGS. 2 and 4, interleaving circuit 140 may initialize a flag k to '1' (S151) and may compare the output voltage V_out with the reference voltage V_ref (S152). When the output voltage V_out is equal to the reference voltage V_ref, interleaving circuit 140 may output a k-th set signal to a k-th regulating circuit (S153). Interleaving circuit 140 may check if the flag k is equal to a predetermined natural number n (S154). In one embodiment, the predetermined natural number n may be the number of regulating circuits. When the flag k is not equal to the predetermined natural number n, '1' may be added to the flag k (S155), and then, operations S152 to S154 may be repeated. When the flag k is equal to the predetermined natural number n, the flag k may be initialized to '1' (S151), and then, operations S152 to S154 may be repeated.

Figure 5:
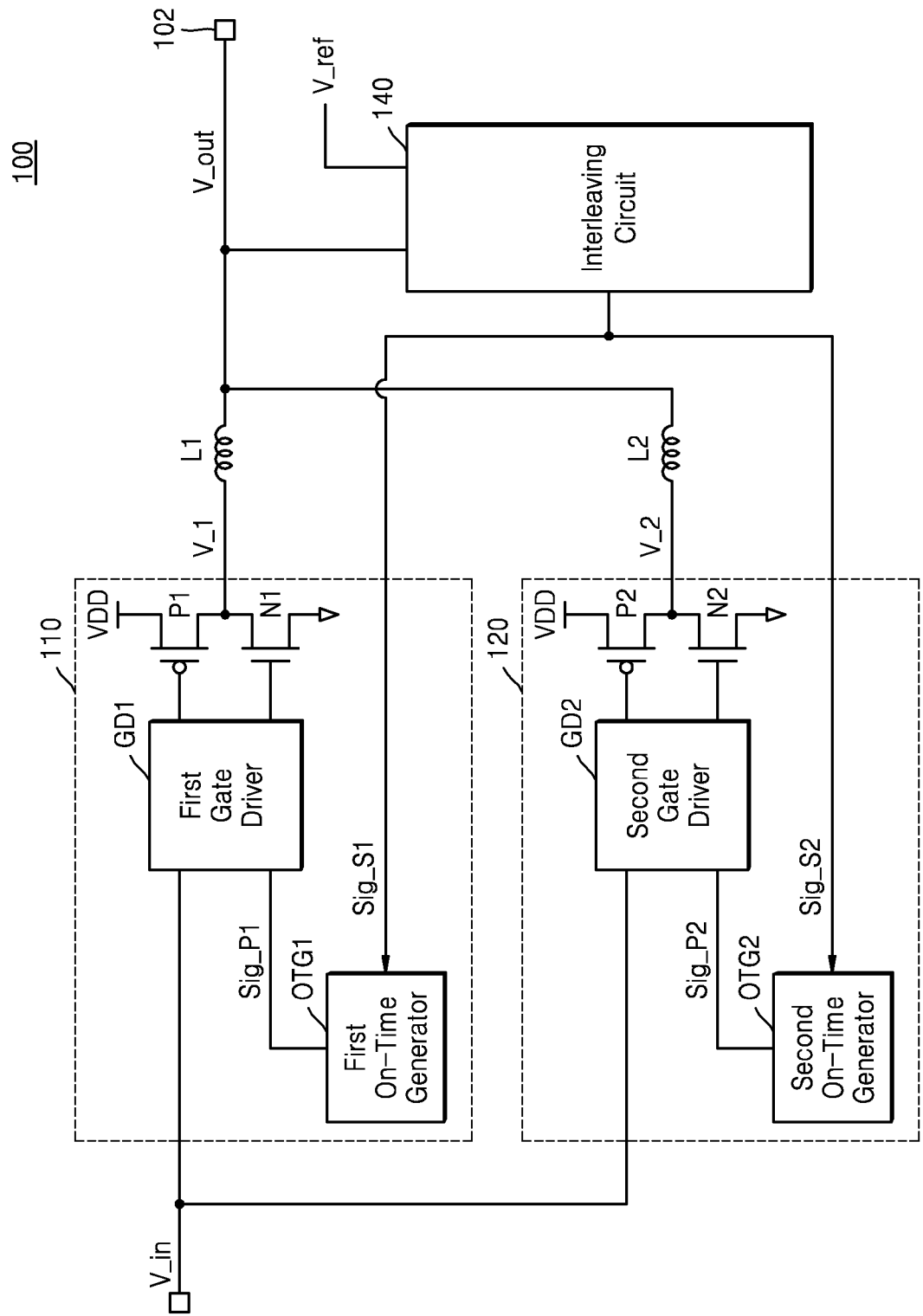
FIG. 5 is a circuit diagram illustrating an example embodiment of a switching regulator.

FIG. 5 is a circuit diagram illustrating an example embodiment of a switching regulator. Repeated descriptions given with reference to FIG. 2 will be omitted.

Referring to FIG. 5, switching regulator 100 may include first regulating circuit 110, second regulating circuit 120, a plurality of inductors L1 and L2, and interleaving circuit 140. Although FIG. 5 illustrates an example in which switching regulator 100 includes two regulating circuits 110 and 120, this is merely an example, and switching regulator 100 may include more than two regulating circuits, as described above with reference to FIG. 2.

First regulating circuit 110 may include a first gate driver GD1, a first on-time generator OTG1, and a plurality of transistors P1 and N1. The first on-time generator OTG1 may receive the first set signal Sig_S1 from interleaving circuit 140 and may output a first power input signal Sig_P1 to the first gate driver GD1 in response to the first set signal Sig_S1.

In one embodiment, the first on-time generator OTG1 may transit the first power input signal Sig_P1 to a logic high level (for example, '1') in response to the first set signal Sig_S1, and thus, the first gate driver GD1 may increase a voltage level of the first sub-output voltage V_1 by driving a first PMOS transistor P1 connected to a power supply voltage. The first on-time generator OTG1 may transit the first power input signal Sig_P1 to a logic low level (for example, '0') when a predetermined time period elapses, and thus, the first gate driver GD1 may decrease the voltage level of the first sub-output voltage V_1 by driving a first NMOS transistor N1 connected to the power supply voltage.

Second regulating circuit 120 may include a second gate driver GD2, a second on-time generator OTG2, and a plurality of transistors P2 and N2. Descriptions of operations of second regulating circuit 120 similar to those of first regulating circuit 110 will be omitted.

According to one or more embodiments, the first on-time generator OTG1 and the second on-time generator OTG2 may respectively generate power input signals Sig_P1 and Sig_P2 based on set signals Sig_S1 and Sig_S2 generated by interleaving circuit 140 configured independently of regulating circuits 110 and 120, and thus, a phase difference between a plurality of sub-output voltages V_1 and V_2 respectively generated by regulating circuits 110 and 120 may be maintained constant.

Figure 6:
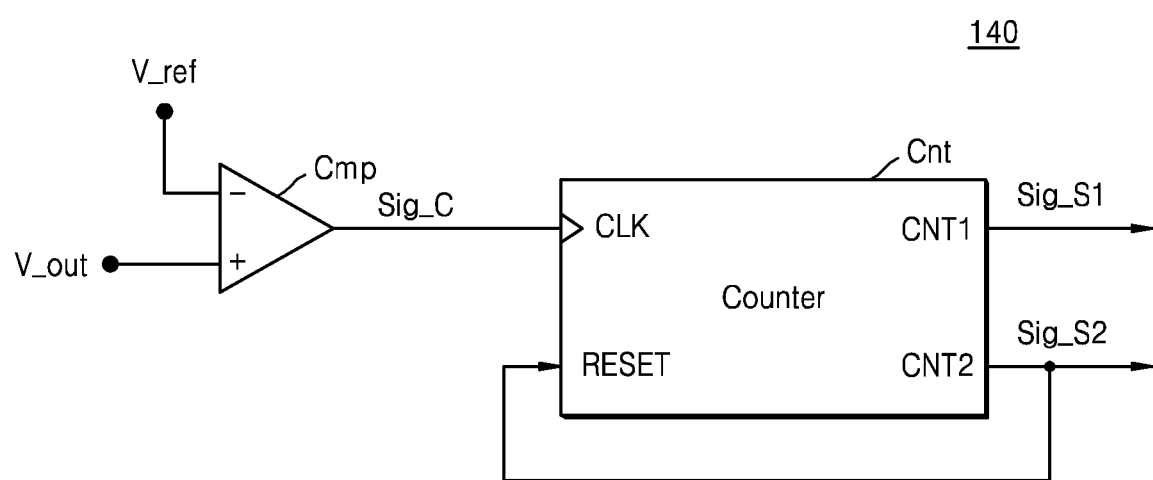
FIG. 6 is a block diagram illustrating an example embodiment of an interleaving circuit.

FIG. 6 is a block diagram illustrating an example embodiment of an interleaving circuit.

Referring to FIG. 6, interleaving circuit 140 may include a comparator Cmp and a counter Cnt. The comparator Cmp may compare the output voltage V_out with the reference voltage V_ref and may output a clock signal Sig_C to the counter Cnt when a voltage level of the output voltage V_out is equal to a voltage level of the reference voltage V_ref.

The counter Cnt may sequentially output the first set signal Sig_S1 and the second set signal Sig_S2 in response to the clock signal Sig_C. Although FIG. 6 illustrates an embodiment in which interleaving circuit 140 outputs two set signals Sig_S1 and Sig_S2, this is merely an example, and when interleaving circuit 140 outputs three or more set signals, the counter Cnt may include more than two output terminals and sequentially output three or more set signals.

The counter Cnt may reset counting after outputting the last set signal (e.g., second set signal Sig_S2. Thus, the counter Cnt may output the first set signal Sig_S1 again in response to the clock signal Sig_C.

Figure 7:
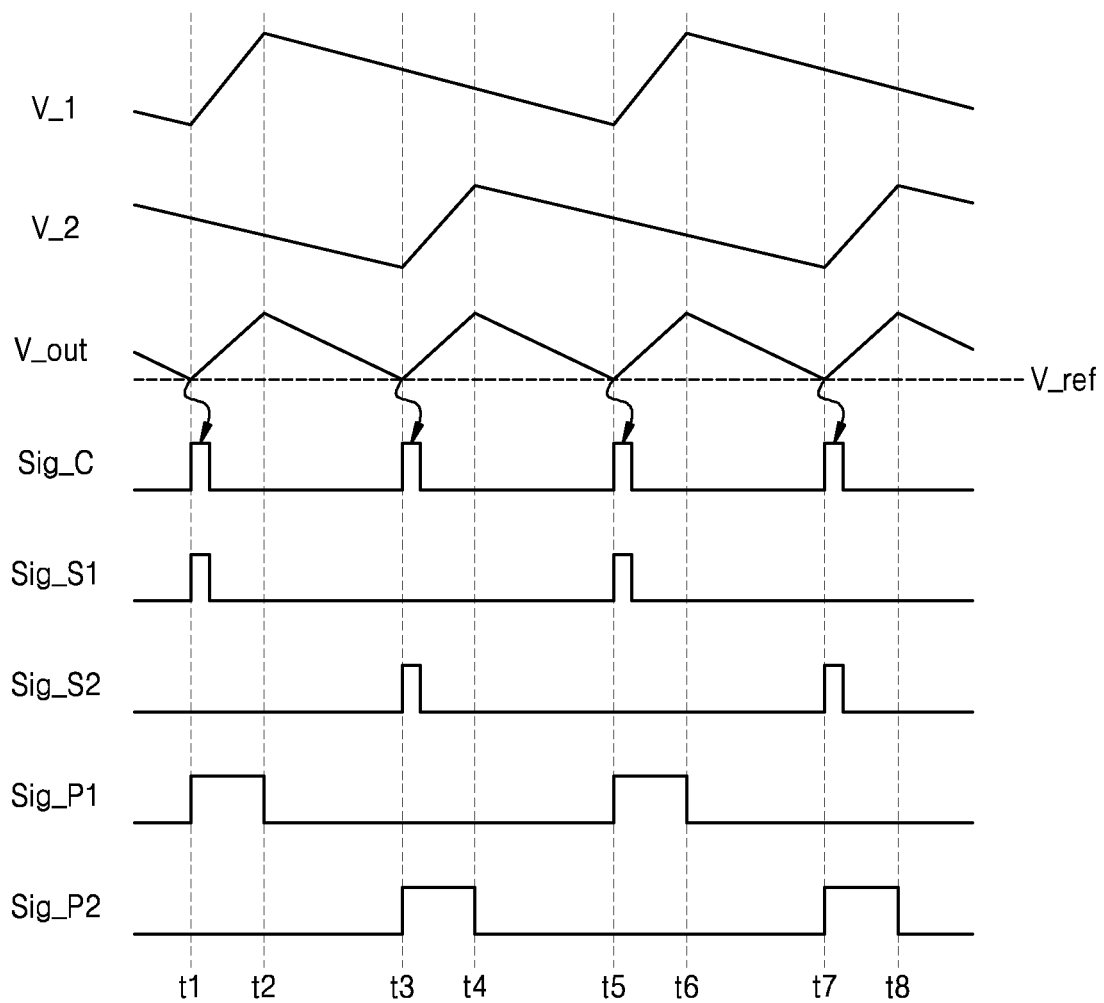
FIG. 7 is a timing diagram illustrating an example embodiment of operations of a switching regulator.

FIG. 7 is a timing diagram illustrating operations of an example embodiment of a switching regulator.

Referring to FIGS. 5, 6, and 7, at a first time point t1, the output voltage V_out may reach the reference voltage V_ref, and the comparator Cmp may transit the clock signal Sig_C to a logic high level in response thereto. The counter Cnt may transit the first set signal Sig_S1 to a logic high level in response to the clock signal Sig_C, and the first on-time generator OTG1 may transit the first power input signal Sig_P1 to a logic high level in response to the first set signal Sig_S1. The first gate driver GT1 may drive the first PMOS transistor P1 in response to the first power input signal Sig_P1, whereby the voltage level of the first sub-output voltage V_1 may increase. In addition, accordingly, the voltage level of the output voltage V_out may also increase.

At a second time point t2 at which a predetermined time period has elapsed, the first on-time generator OTG1 may transit the first power input signal Sig_P1 to a logic low level, and the first gate driver GT1 may drive the first NMOS transistor N1 in response thereto, whereby the voltage level of the first sub-output voltage V_1 may be decreased. In addition, the voltage level of the output voltage V_out may also decrease.

At a third time point t3, the output voltage V_out may reach the reference voltage V_ref, and the comparator Cmp may transit the clock signal Sig_C to a logic high level in response thereto. The counter Cnt may transit the second set signal Sig_S2 to a logic high level in response to the clock signal Sig_C, and the second on-time generator OTG2 may transit the second power input signal Sig_P2 to a logic high level in response to the second set signal Sig_S2. The second gate driver GT2 may drive a second PMOS transistor P2 in response to the second power input signal Sig_P2, whereby a voltage level of the second sub-output voltage V_2 may increase. In addition, accordingly, the voltage level of the output voltage V_out may also increase.

At a fourth time point t4 at which a predetermined time period has elapsed, the second on-time generator OTG2 may transit the second power input signal Sig_P2 to a logic low level, and the second gate driver GT2 may drive a second NMOS transistor N2 in response thereto, whereby the voltage level of the second sub-output voltage V_2 may decrease. In addition, the voltage level of the output voltage V_out may also decrease.

Since operations of switching regulator 100 at respective time points t5 to t8 may be identical or similar to the operations of switching regulator 100 at the respective time points t1 to t4, descriptions thereof will be omitted.

According to one or more embodiments, interleaving circuit 140 may sequentially output the plurality of set signals Sig_S1 and Sig_S2 generated by comparing the output voltage V_out with the reference voltage V_ref, whereby the phase difference between the first sub-output voltage V_1 and the second sub-output voltage V_2 may be maintained constant, and thus, the output voltage V_out may be stably output.

Figure 8:
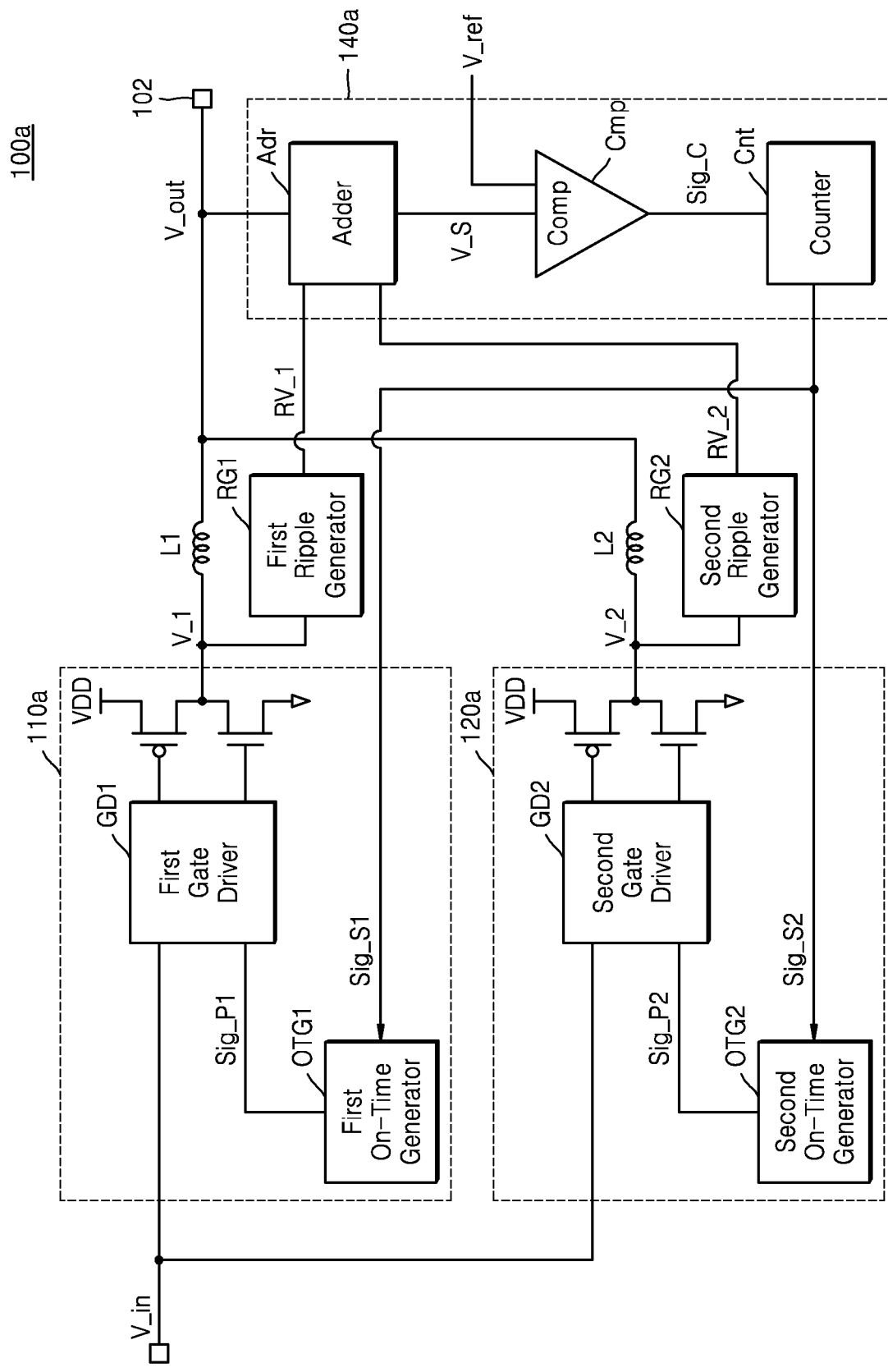
FIG. 8 is a block diagram illustrating an example embodiment of a switching regulator.

FIG. 8 is a block diagram illustrating an example embodiment of a switching regulator. Repeated descriptions given with reference to FIG. 5 will be omitted.

Referring to FIG. 8, a switching regulator 100a may include a first regulating circuit 110a, a second regulating circuit 120a, the plurality of inductors L1 and L2, an interleaving circuit 140a, a first ripple generator RG1, and a second ripple generator RG2. Since the first regulating circuit 110a, second regulating circuit 120a, and the plurality of inductors L1 and L2 are respectively identical or similar to the first regulating circuit 110, second regulating circuit 120, and the plurality of inductors L1 and L2 described above with reference to FIG. 5, descriptions thereof will be omitted.

The first ripple generator RG1 may output, to an adder Adr, a first ripple voltage RV_1 generated thereby based on the first sub-output voltage V_1. The second ripple generator RG2 may output, to the adder Adr, a second ripple voltage RV_2 generated thereby based on the second sub-output voltage V_2.

Interleaving circuit 140a may include the adder Adr, comparator Cmp, and the counter Cnt, and the adder Adr may output, to the comparator Cmp, a summed voltage V_s obtained by summing up the output voltage V_out, the first ripple voltage RV_1, and the second ripple voltage RV_2. The comparator Cmp may compare the summed voltage V_s with the reference voltage V-ref and may output the clock signal Sig_C based on a result of the comparison between the summed voltage V_s and the reference voltage V-ref. The counter Cnt may sequentially output the plurality of set signals Sig_S1 and Sig_S2 based on the clock signal Sig_C, in the manner described above with reference to FIG. 6.

Figure 9:
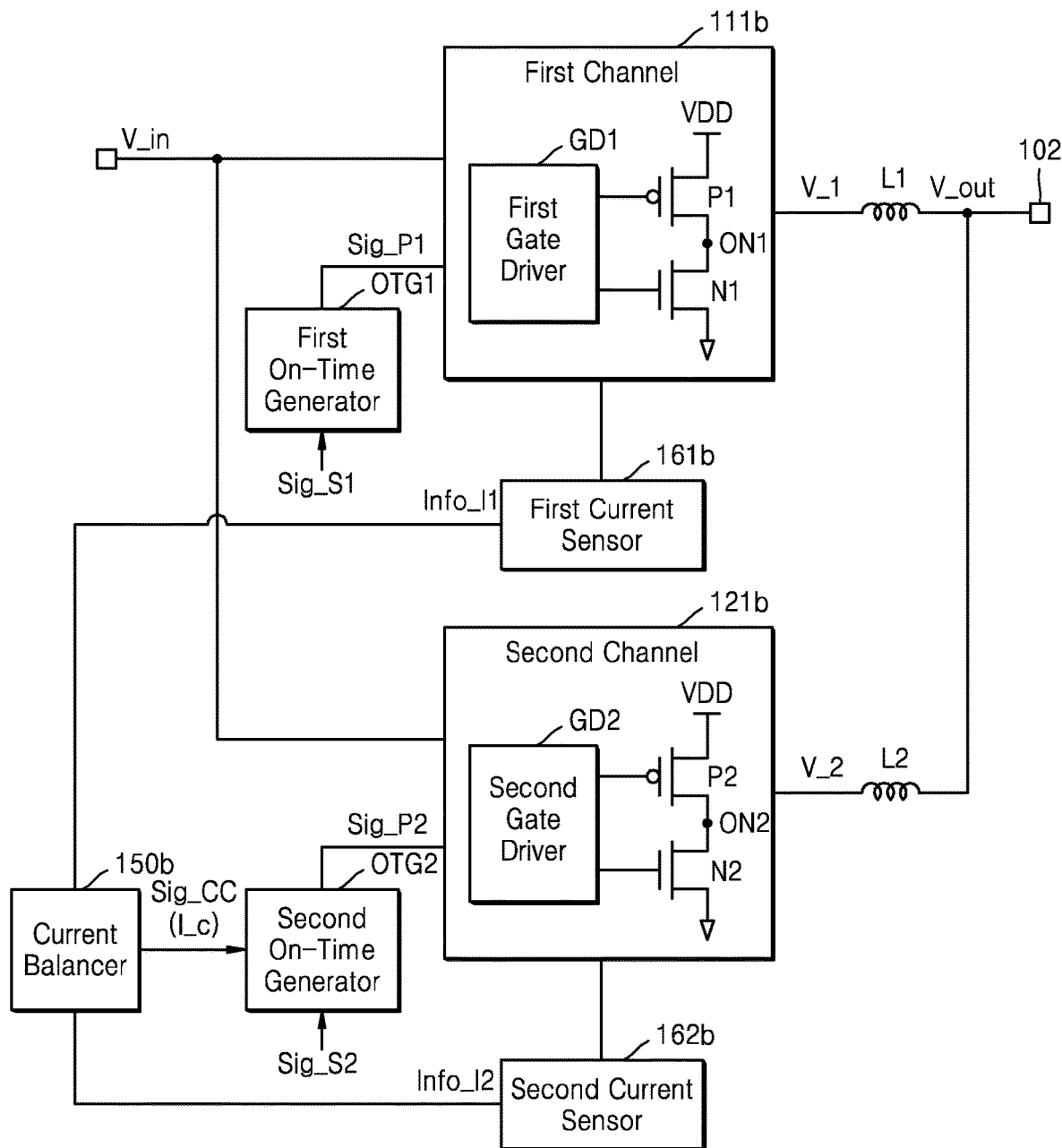
FIG. 9 is a block diagram illustrating an example embodiment of a switching regulator.

FIG. 9 is a block diagram illustrating an example embodiment of a switching regulator. Repeated descriptions given with reference to FIG. 5 will be omitted.

Referring to FIG. 9, a switching regulator 100b may include a first channel 111b, first on-time generator OTG1, a first current sensor 161b, a second channel 121b, second on-time generator OTG2, a second current sensor 162b, the plurality of inductors L1 and L2, and a current balancer 150b. First channel 111b may include the first gate driver GD1 and a plurality of first transistors P1 and N1, and second channel 121b may include the second gate driver GD2 and a plurality of second transistors P2 and N2.

First current sensor 161b may sense a current flowing through first channel 111b. In one embodiment, first current sensor 161b may sense a first current flowing through a first output node ON1, to which the first PMOS transistor P1 and the first NMOS transistor N1 are connected. In one example, the first current may refer to a current flowing from a source to a drain of the first PMOS transistor P1 or a current flowing from a source to a drain of the first NMOS transistor N1. First current sensor 161b may output, to current balancer 150b, first current information Info_I1 generated thereby as a result of sensing the first current.

Second current sensor 162b may sense a current flowing through second channel 121b. In one embodiment, second current sensor 162b may sense a second current flowing through a second output node ON2, to which the second PMOS transistor P2 and the second NMOS transistor N2 are connected. In one example, the second current may refer to a current flowing from a source to a drain of the second PMOS transistor P2 or a current flowing from a source to a drain of the second NMOS transistor N2. Second current sensor 162b may output, to current balancer 150b, second current information Info_I2 generated thereby as a result of sensing the second current.

Current balancer 150b may output a current control signal Sig_CC based on the first current information Info_I1 and the second current information Info_I2. In one embodiment, current balancer 150b may generate a control current I_c as the current control signal Sig_CC based on a difference between the first current and the second current. The second on-time generator OTG2 may receive the current control signal Sig_CC and may output the second power input signal Sig_P2 to second channel 121b based thereon. In one embodiment, the second on-time generator OTG2 may adjust a logic high period of the second power input signal Sig_P2 based on the current control signal Sig_CC. As the logic high period of the second power input signal Sig_P2 is adjusted, voltage levels of the first sub-output voltage V_1 and the second sub-output voltage V_2 may be maintained equal to each other. An example will be described below in detail with reference to FIG. 11.

Figure 10:
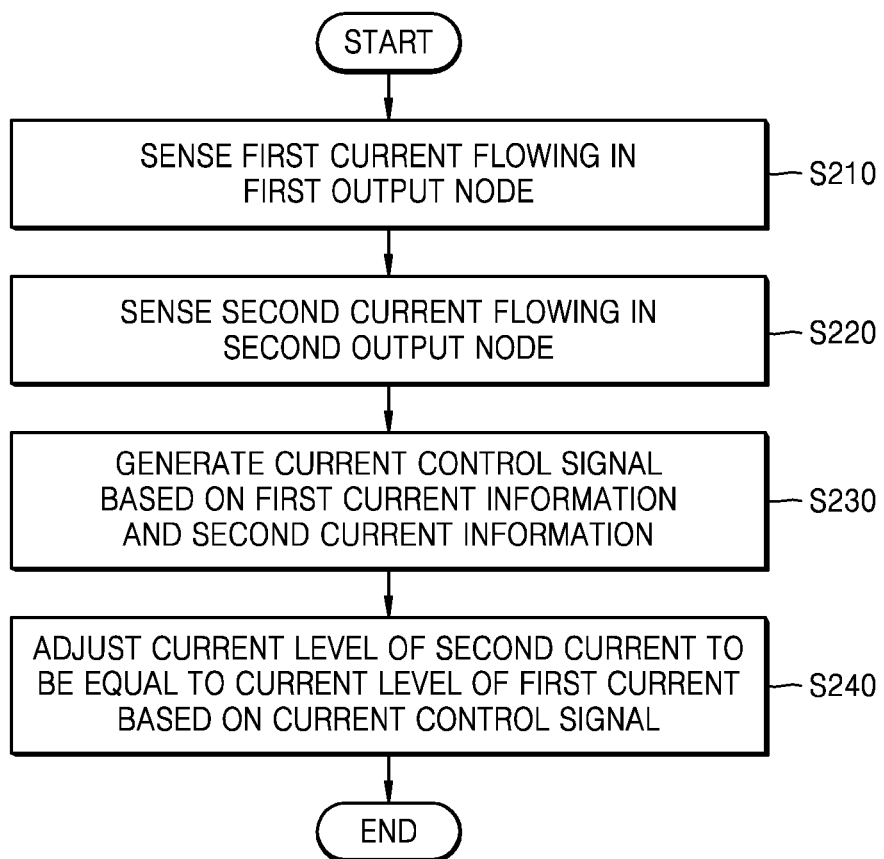
FIG. 10 is a flowchart illustrating an example embodiment of a method of operating a switching regulator.

FIG. 10 is a flowchart illustrating an example embodiment of a method of operating a switching regulator.

Referring to FIGS. 9 and 10, switching regulator 100 may sense the first current flowing in the first output node ON1 (S210) and may sense the second current flowing in the second output node ON2 (S220). The switching regulator 100 may generate the current control signal Sig_CC based on the first current information Info_I1 including a sensing value of the first current and the second current information Info_I2 including a sensing value of the second current (S230). The switching regulator 100 may adjust a current level of the second current to be equal to a current level of the first current based on the current control signal Sig_CC (S240).

Figure 11:
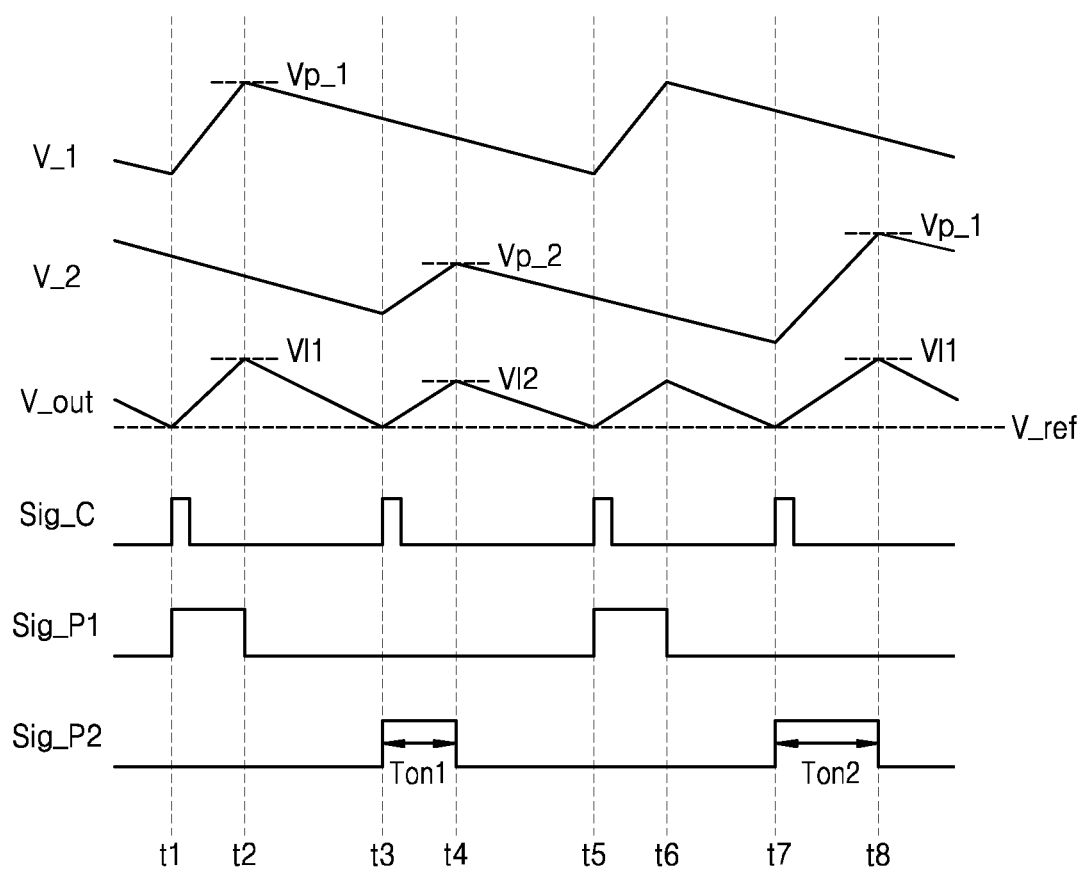
FIG. 11 is a timing diagram illustrating operations of an example embodiment of a switching regulator.

FIG. 11 is a timing diagram illustrating operations of an example embodiment of a switching regulator, according to an example embodiment.

Referring to FIGS. 9 and 11, at the first time point t1, the output voltage V_out may reach the reference voltage V_ref, and the comparator Cmp may transit the clock signal Sig_C to a logic high level in response thereto. Thus, the first on-time generator OTG1 may transit the first power input signal Sig_P1 to a logic high level, the voltage level of the first sub-output voltage V_1 may increase up to a first peak voltage level Vp_1, and the output voltage V_out may increase up to a first voltage level V11.

As a predetermined time period has elapsed, at the second time point t2, the first power input signal Sig_P1 may be transited to a logic low level, and thus, respective voltage levels of the first sub-output voltage V_1 and the output voltage V_out may decrease.

At the third time point t3, when the output voltage V_out reaches the reference voltage V_ref, the comparator Cmp may transit the clock signal Sig_C to a logic high level in response thereto. Thus, the second on-time generator OTG2 may transit the second power input signal Sig_P2 to a logic high level, the voltage level of the second sub-output voltage V_2 may increase up to a second peak voltage level Vp_2, and the output voltage V_out may increase up to a second voltage level V12. After a predetermined first time period Ton1 has elapsed, at the fourth time point t4, the second power input signal Sig_P2 may be transited to a logic low level, and thus, respective voltage levels of the second sub-output voltage V_2 and the output voltage V_out may decrease.

Current balancer 150b may receive the first current information Info_I1 from first channel 111b and receive the second current information Info_I2 from second channel 121b. Since the first peak voltage level Vp_1 of the first sub-output voltage V_1 is different from the second peak voltage level Vp_2 of the second sub-output voltage V_2, a value of the first current according to the first current information Info_I1 may also be different from a value of the second current according to the second current information Info_I2. Thus, current balancer 150b may output, to the second on-time generator OTG2, the current control signal Sig_CC corresponding to a difference between the first current and the second current, and the second on-time generator OTG2 may adjust a logic high maintaining period of the second power input signal Sig_P2.

At time points t5 to t7, the output voltage V_out may be increased and then decreased by first channel 111b. At a time point t7, when the output voltage V_out reaches the reference voltage V_ref, the second on-time generator OTG2 may transit the second power input signal Sig_P2 to a logic high level. The second on-time generator OTG2 may maintain the second power input signal Sig_P2 at a logic high level for a time period Ton2 that is adjusted, and the voltage level of the second sub-output voltage V_2 may increase up to the first peak voltage level Vp_1. In addition, the output voltage V_out may increase up to the first voltage level V11. After the second time period Ton2 has elapsed, at a time point t8, the second power input signal Sig_P2 may be transited to a logic low level, and thus, the respective voltage levels of the second sub-output voltage V_2 and the output voltage V_out may decrease.

According to one embodiment, current balancer 150b adaptively adjusts the logic high maintaining period or duty ratio of the second power input signal Sig_P2 based on the first current information Info_I1 and the second current information Info_I2, whereby a difference in peak voltage between the sub-output voltages V1 and V2 may be reduced, and the voltage level of the output voltage V_out may be stably maintained.

Although FIG. 11 illustrates an example in which the logic high maintaining period of the second power input signal Sig_P2 is adjusted based on the first current information Info_I1 and the second current information Info_I2, in another example current balancer 150b may adjust a logic low maintaining period of the second power input signal Sig_P2 based on the first current information Info_I1 and the second current information Info_I2.

Figure 12:
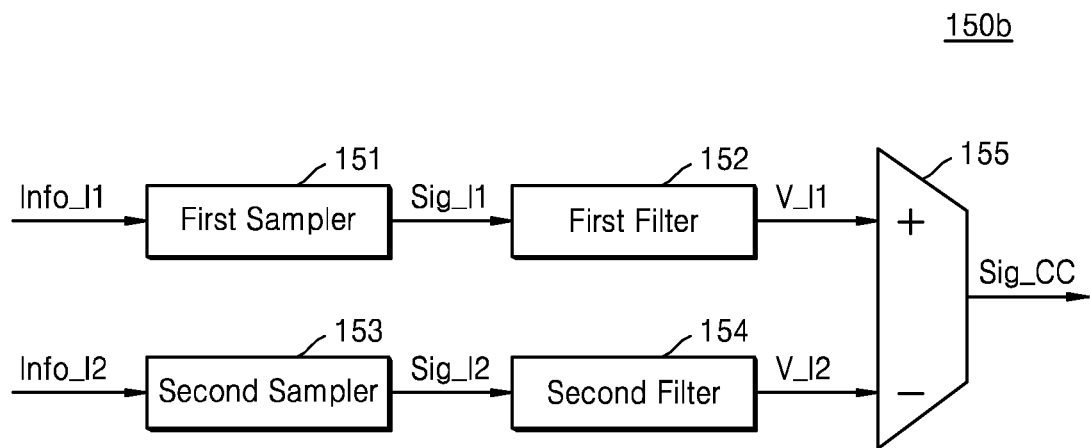
FIG. 12 is a block diagram illustrating an example embodiment of a current balancer.

FIG. 12 is a block diagram illustrating an example embodiment of a current balancer.

Referring to FIG. 12, current balancer 150b may include a first sampler 151, a first filter 152, a second sampler 153, a second filter 154, and an amplifier 155. First sampler 151 may generate a first current signal Sig_I1 by performing sampling and hold operations for the first current information Info_I1. In one example, first sampler 151 may include a sample & hold circuit. First filter 152 may generate a first DC current value V_I1 by filtering the first current signal Sig_I1. The first DC current value V_I1 may include only a DC component of the first current signal Sig_I1. In one example, first filter 152 may include a low pass filter (LPF).

Second sampler 153 may generate a second current signal Sig_I2 by performing sampling and hold operations for the second current information Info_I2. In one example, second sampler 153 may include a sample & hold circuit. Second filter 154 may generate a second DC current value V_I2 by filtering the second current signal Sig_I2. The second DC current value V_I2 may include only a DC component of the second current signal Sig_I2. In one example, second filter 154 may include an LPF.

Amplifier 155 may generate the current control signal Sig_CC based on a difference between the first DC current value V_I1 and the second DC current value V_I2. In one example, amplifier 155 may include an operational transconductance amplifier (OTA).

Figure 13:
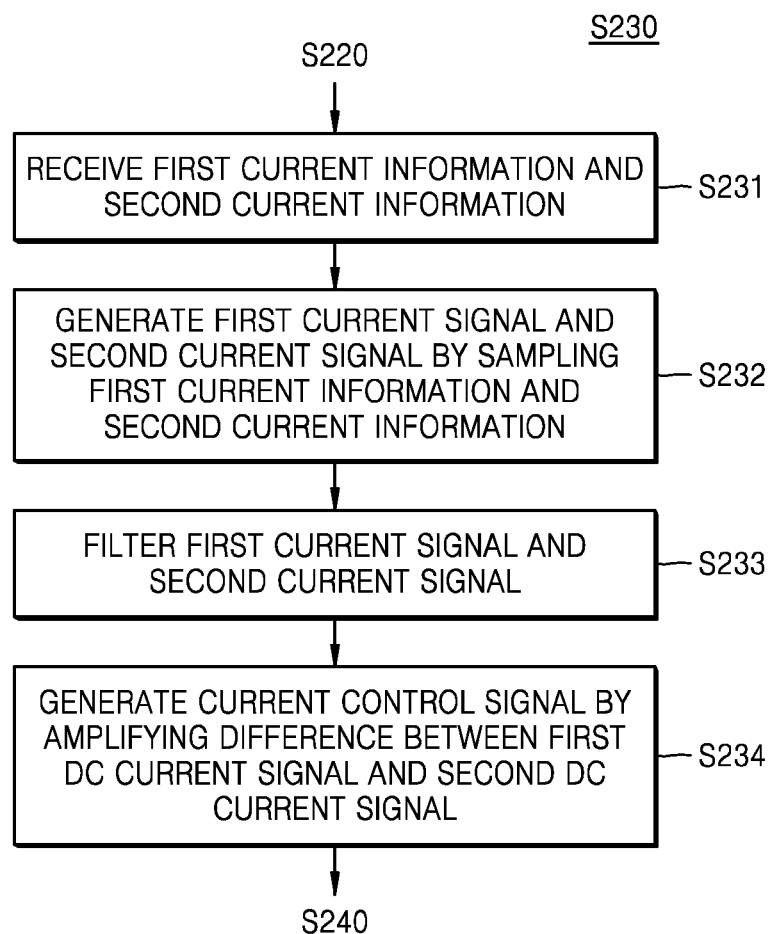
FIG. 13 is a flowchart illustrating an example embodiment of a method of operating a current balancer.

FIG. 13 is a flowchart illustrating an example embodiment of a method of operating a current balancer. In particular, FIG. 13 is a flowchart illustrating an embodiment of a method of operating a current balancer, corresponding to an operation of generating a current control signal (S230) in FIG. 10.

Referring to FIGS. 12 and 13, current balancer 150b may receive the first current information Info_I1 and the second current information Info_I2 (S231) and may generate the first current signal Sig_I1 and the second current signal Sig_I2 by sampling the first current information Info_I1 and the second current information Info_I2, respectively (S232). Current balancer 150b may filter the first current signal Sig_I1 and the second current signal Sig_I2 (S233) to generate the first DC current value V_I1 and the second DC current value V_I2, respectively, and may generate the current control signal Sig_CC by amplifying the difference between the first DC current value V_I1 and the second DC current value V_I2 (S234).

Figure 14:
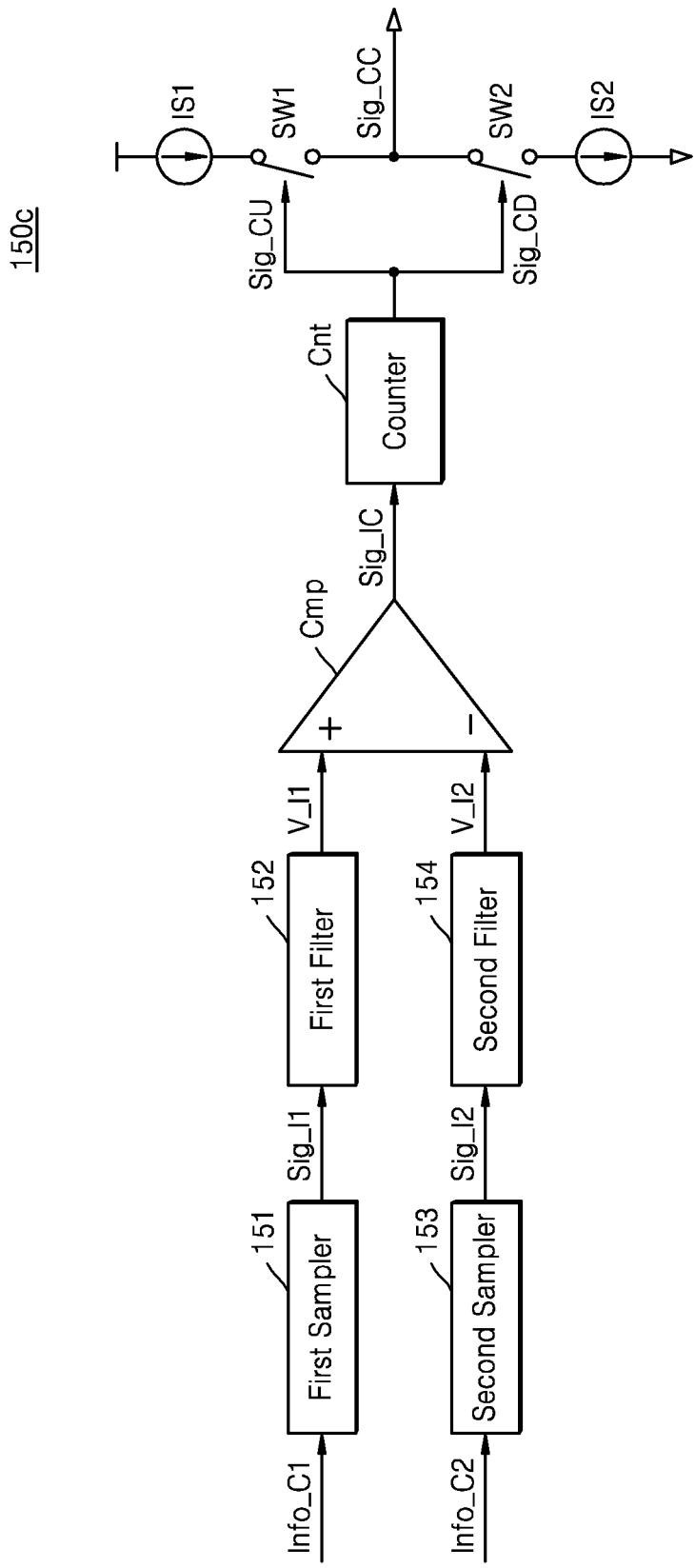
FIG. 14 is a block diagram illustrating another example embodiment of a current balancer.

FIG. 14 is a block diagram illustrating another example embodiment of a current balancer.

Referring to FIG. 14, a current balancer 150c may include first sampler 151, first filter 152, second sampler 153, second filter 154, the comparator Cmp, the counter Cnt, a plurality of current sources IS1 and IS2, and a plurality of switches SW1 and SW2. Since first sampler 151, first filter 152, second sampler 153, and second filter 154 have been described above with reference to FIG. 12, descriptions thereof will be omitted.

The comparator Cmp may respectively receive the first DC current value V_I1 and the second DC current value V_I2 from first filter 152 and second filter 154, respectively, and may output, to the counter Cnt, a current comparison signal Sig_IC that is a result of comparison between the first DC current value V_I1 and the second DC current value V_I2. The counter Cnt may output a current raising signal Sig_CU to a first switch SW1 or output a current sinking signal Sig_CD to a second switch SW2, based on the current comparison signal Sig_IC.

In one case, when the first DC current value V_I1 is greater than the second DC current value V_I2, the counter Cnt may output the current raising signal Sig_CU to the first switch SW1, and thus, a current value corresponding to the current control signal Sig_CC may increase. In another case, when the first DC current value V_I1 is less than the second DC current value V_I2, the counter Cnt may output the current sinking signal Sig_CD to the second switch SW2, and thus, the current value corresponding to the current control signal Sig_CC may decrease.

Figure 15:
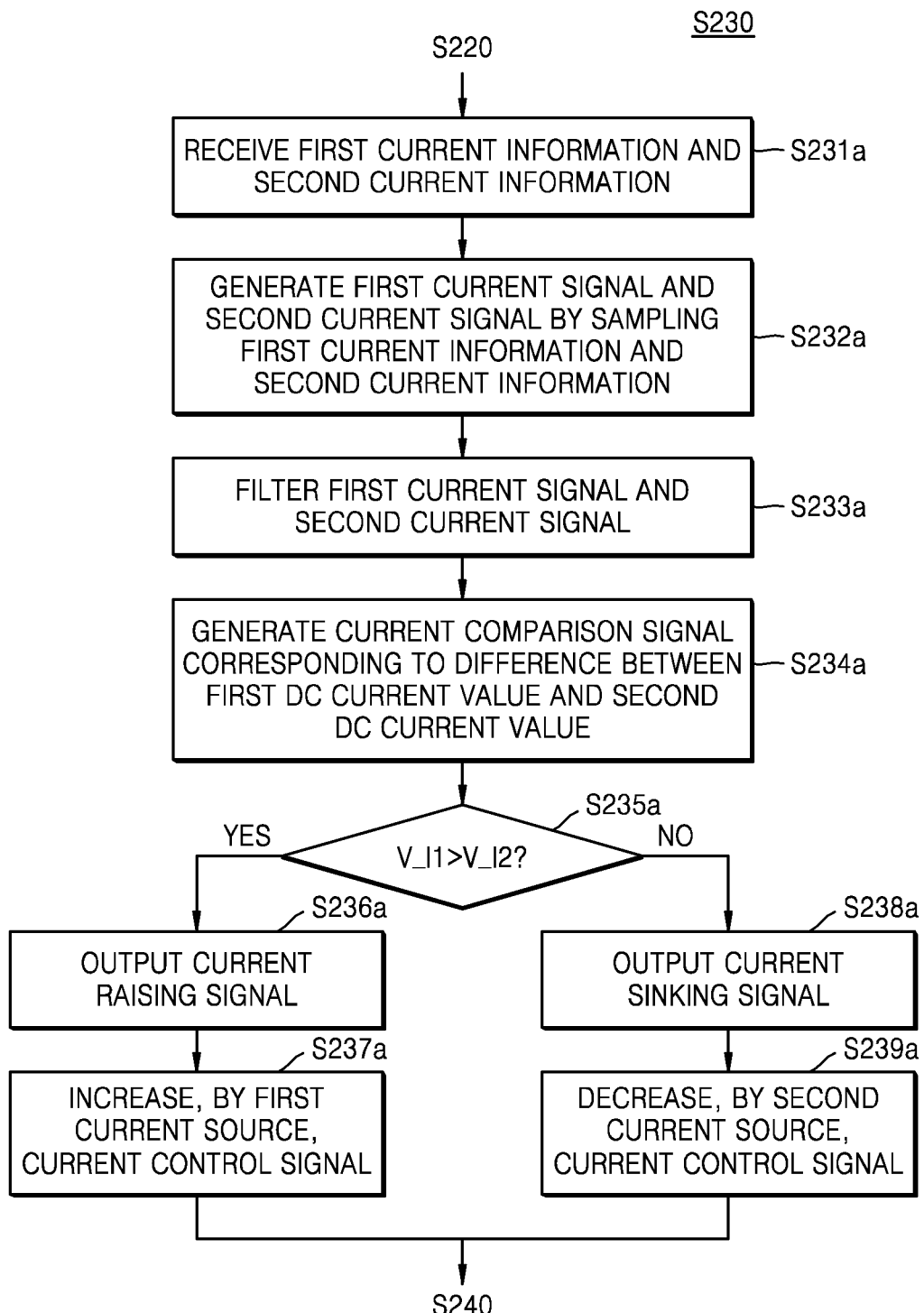
FIG. 15 is a flowchart illustrating another example embodiment of a method of operating a current balancer.

FIG. 15 is a flowchart illustrating another example embodiment of a method of operating a current balancer. In particular, FIG. 15 is a flowchart illustrating an embodiment of a method of operating a current balancer, corresponding to an operation of generating a current control signal (S230) in FIG. 10.

Referring to FIGS. 14 and 15, current balancer 150c may receive the first current information Info_I1 and the second current information Info_I2 (S231a) and may generate the first current signal Sig_I1 and the second current signal Sig_I2 by sampling the first current information Info_I1 and the second current information Info_I2, respectively (S232a). Current balancer 150c may filter the first current signal Sig_I1 and the second current signal Sig_I2 (S233a) to generate the first DC current value V_I1 and the second DC current value V_I2, respectively, and may generate the current comparison signal Sig_IC corresponding to the difference between the first DC current value V_I1 and the second DC current value V_I2 (S234a).

Current balancer 150c may determine if the first DC current value V_I1 is greater than the second DC current value V_I2 based on the current comparison signal Sig_IC (S235a).

When the first DC current value V_I1 is greater than the second DC current value V_I2, the counter Cnt may output the current raising signal Sig_CU to the first switch SW1 (236a), and a current level of the current control signal Sig_CC may be increased by a first current source IS1 (237a). When the first DC current value V_I1 is not greater than the second DC current value V_I2, the counter Cnt may output the current sinking signal Sig_CD to the second switch SW2 (S238a), and the current level of the current control signal Sig_CC may be decreased by a second current source IS2 (S239a).

Figure 16:
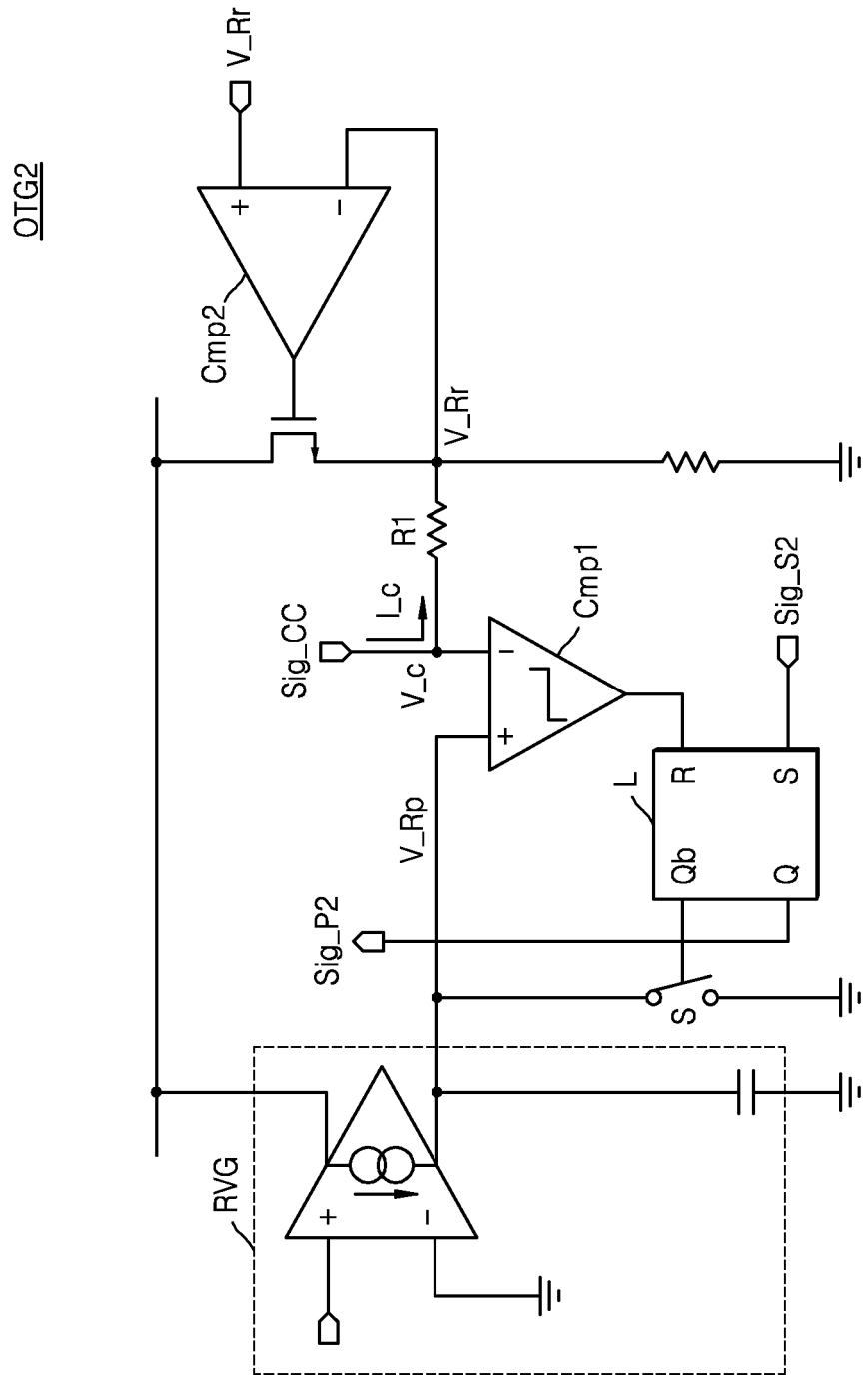
FIG. 16 is a circuit diagram illustrating an example embodiment of a second on-time generator.

FIG. 16 is a circuit diagram illustrating an example embodiment of a second on-time generator. In particular, FIG. 16 is a circuit diagram illustrating the second on-time generator of FIG. 9.

Referring to FIGS. 9 and 16, the second on-time generator OTG2 may include a ramp voltage generator RVG, a first comparator Cmp1, a second comparator Cmp2, a first resistor R1, a latch L, and a switch S. A comparison voltage V_c may be applied to a negative terminal of the first comparator Cmp1. A control current I_c may flow through the first resistor R1 by a terminal to which the current control signal Sig_CC is applied. Thus, the comparison voltage V_c may be increased or decreased by as much as a voltage drop (I_c*R1) due to the control current I_c from a reference voltage V_Rr provided by the second comparator Cmp2.

The first comparator Cmp1 may output, to the latch L, a comparison result that is generated by comparing the comparison voltage V_c with a ramp voltage V_Rp generated by the ramp voltage generator RVG. The latch L may output a logic high level as the second power input signal Sig_P2 based on the second set signal Sig_S2. When a voltage level of the ramp voltage V_Rp is equal to a voltage level of the comparison voltage V_c based on the comparison result received from the first comparator Cmp1, the latch L may output a logic low level as the second power input signal Sig_P2 and may initialize the ramp voltage V_Rp by closing the switch S.

Figure 17:
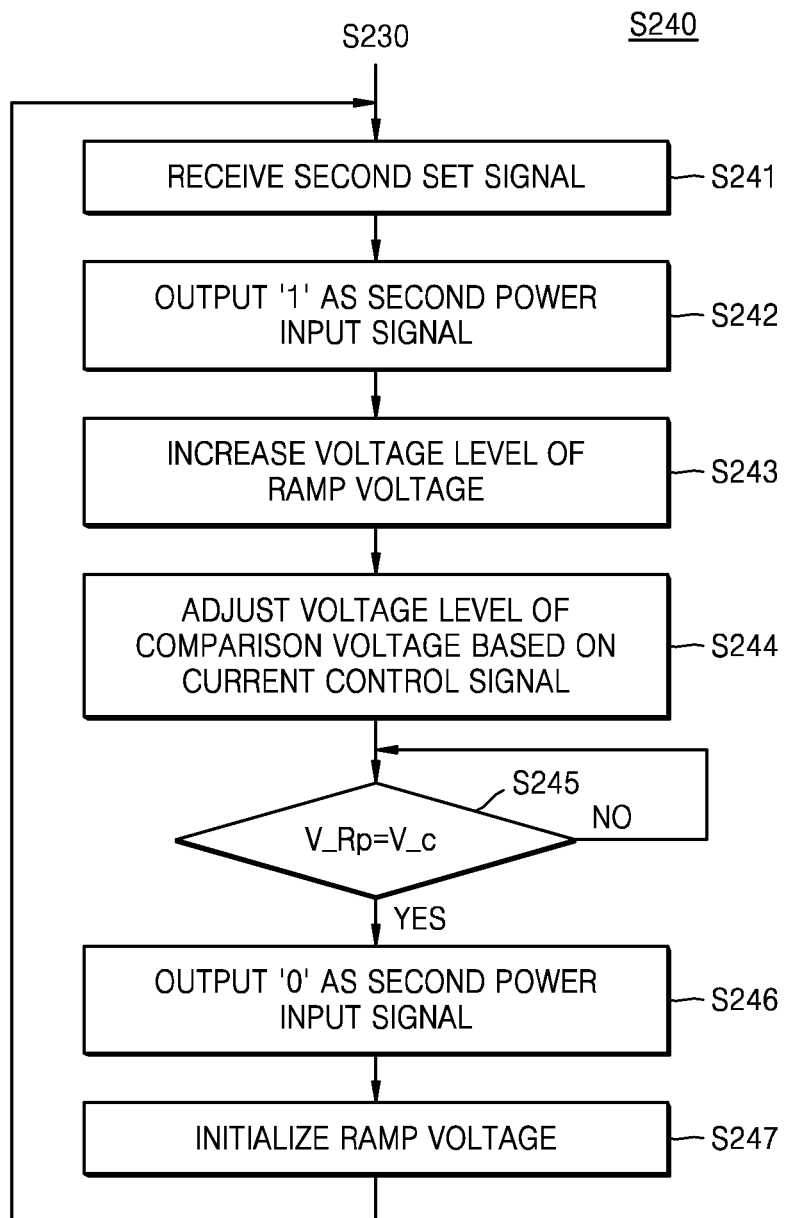
FIG. 17 is a flowchart illustrating an example embodiment of a method of operating a second on-time generator.

FIG. 17 is a flowchart illustrating an example embodiment of a method of operating a second on-time generator. In particular, FIG. 17 is a flowchart illustrating adjusting a current level of a second current corresponding to operation (S240) in FIG. 10.

Referring to FIGS. 16 and 17, the second on-time generator OTG2 may receive the second set signal Sig_S2 (S241) and may output a logic high level (for example, '1') as the second power input signal Sig_P2 in response thereto (S242). In addition, the second on-time generator OTG2 may increase the voltage level of the ramp voltage V_Rp (S243) and may adjust the voltage level of the comparison voltage V_c based on the current control signal Sig_CC (S244). When the increasing voltage level of the ramp voltage V_Rp becomes equal to the voltage level of the comparison voltage V_c (S245), the second on-time generator OTG2 may output a logic low level (for example, '0') as the second power input signal Sig_P2 (S246) and may initialize the ramp voltage V_Rp (S247).

Figure 18:
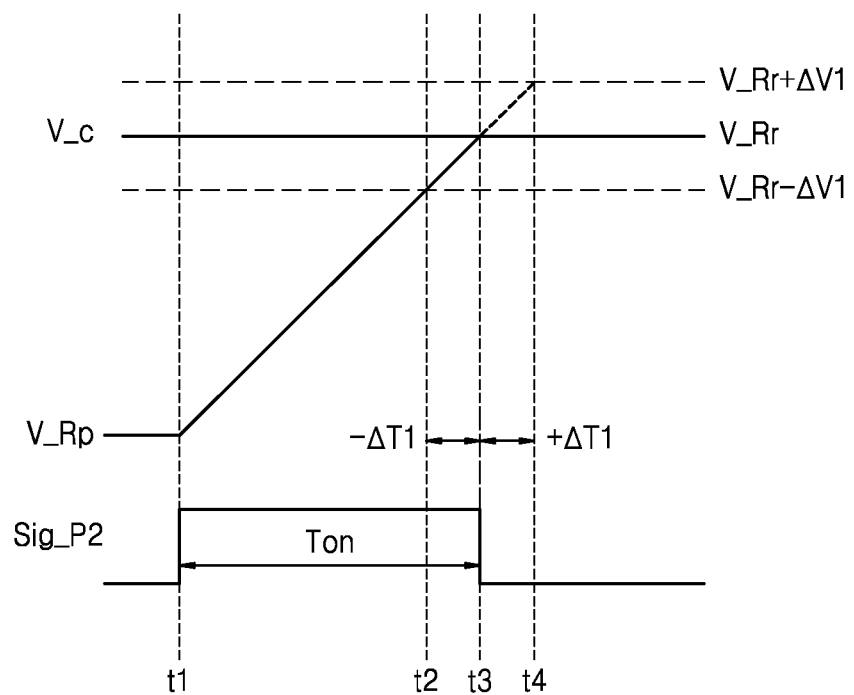
FIG. 18 is a timing diagram illustrating operations of an example embodiment of a second on-time generator.

FIG. 18 is a timing diagram illustrating operations of an example embodiment of a second on-time generator.

Referring to FIGS. 14, 16, and 18, at the time point t1, the voltage level of the ramp voltage V_Rp may increase, and the latch L may transit the second power input signal Sig_P2 to a logic high level based on the second set signal Sig_S2. When the first DC current value V_I1 is less than the second DC current value V_I2, the control current I_c flowing through the first resistor R1 may have a negative value, and thus, the comparison voltage V_c may have a voltage level which is less than the reference voltage V_Rr by as much as a first voltage difference $\Delta V1$. The first voltage difference $\Delta V1$ may correspond to the product of the control current I_c and first resistor R1. Thus, the latch L may transit the second power input signal Sig_P2 to a logic low level at the second time point t2 that is earlier than the third time point t3. That is, the logic high maintaining period of the second power input signal Sig_P2 may equal Ton−$\Delta T1$ and thus be reduced.

When the first DC current value V_I1 is equal to the second DC current value V_I2, the latch L may transit the second power input signal Sig_P2 to a logic low level at the third time point t3. That is, the logic high maintaining period of the second power input signal Sig_P2 may equal Ton.

When the first DC current value V_I1 is greater than the second DC current value V_I2, the control current I_c flowing through the first resistor R1 may have a positive value, and thus, the comparison voltage V_c may have a voltage level which is greater than the reference voltage V_Rr by as much as the first voltage difference $\Delta V1$. Thus, the latch L may transit the second power input signal Sig_P2 to a logic low level at the fourth time point t4 that is later than the third time point t3. That is, the logic high maintaining period of the second power input signal Sig_P2 may equal Ton+$\Delta T1$ and thus be increased.

Figure 19:
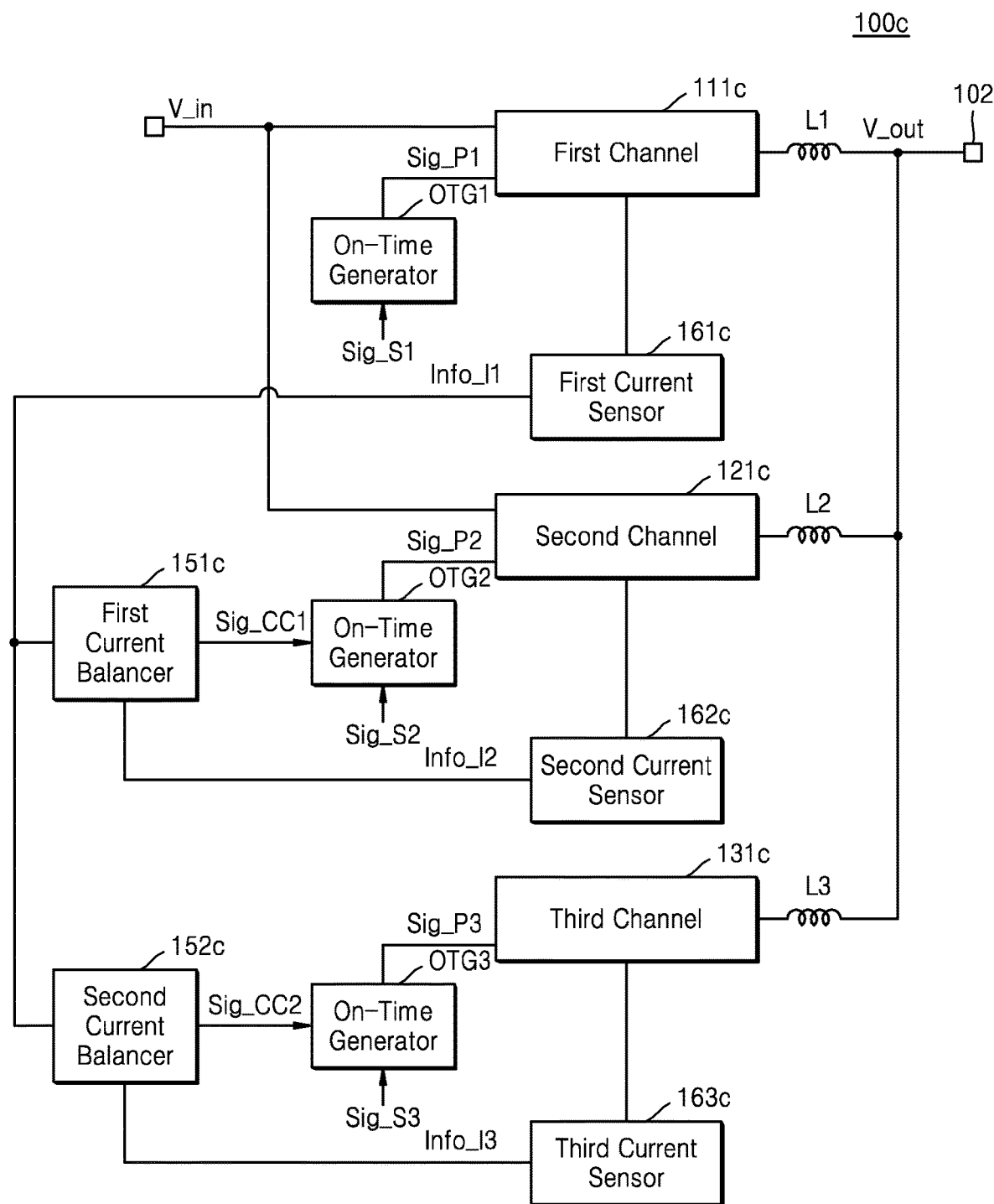
FIG. 19 is a block diagram illustrating an example embodiment of a switching regulator.

FIG. 19 is a block diagram illustrating an example embodiment of a switching regulator. In particular, FIG. 19 illustrates an embodiment in which two current balancers respectively generate current control signals based on first current information. Repeated descriptions given with reference to FIG. 9 will be omitted.

Referring to FIG. 19, a switching regulator 100c may include a first channel 111c, the first on-time generator OTG1, a first current sensor 161c, a second channel 121c, the second on-time generator OTG2, a second current sensor 162c, a third channel 131c, a third on-time generator OTG3, a third current sensor 163c, a plurality of inductors L1, L2, and L3, a first current balancer 151c, and a second current balancer 152c.

First current balancer 151c may generate a first current control signal Sig_CC1 based on the first current information Info_I1 received from the first current sensor 161c and the second current information Info_I2 received from the second current sensor 162c, and the second on-time generator OTG2 may adjust the second power input signal Sig_P2 based on the first current control signal Sig_CC1.

Second current balancer 152c may generate a second current control signal Sig_CC2 based on the first current information Info_I1 received from first current sensor 161c and third current information Info_I3 received from third current sensor 163c, and the third on-time generator OTG3 may adjust a third power input signal Sig_P3 based on the second current control signal Sig_CC2.

Figure 20:
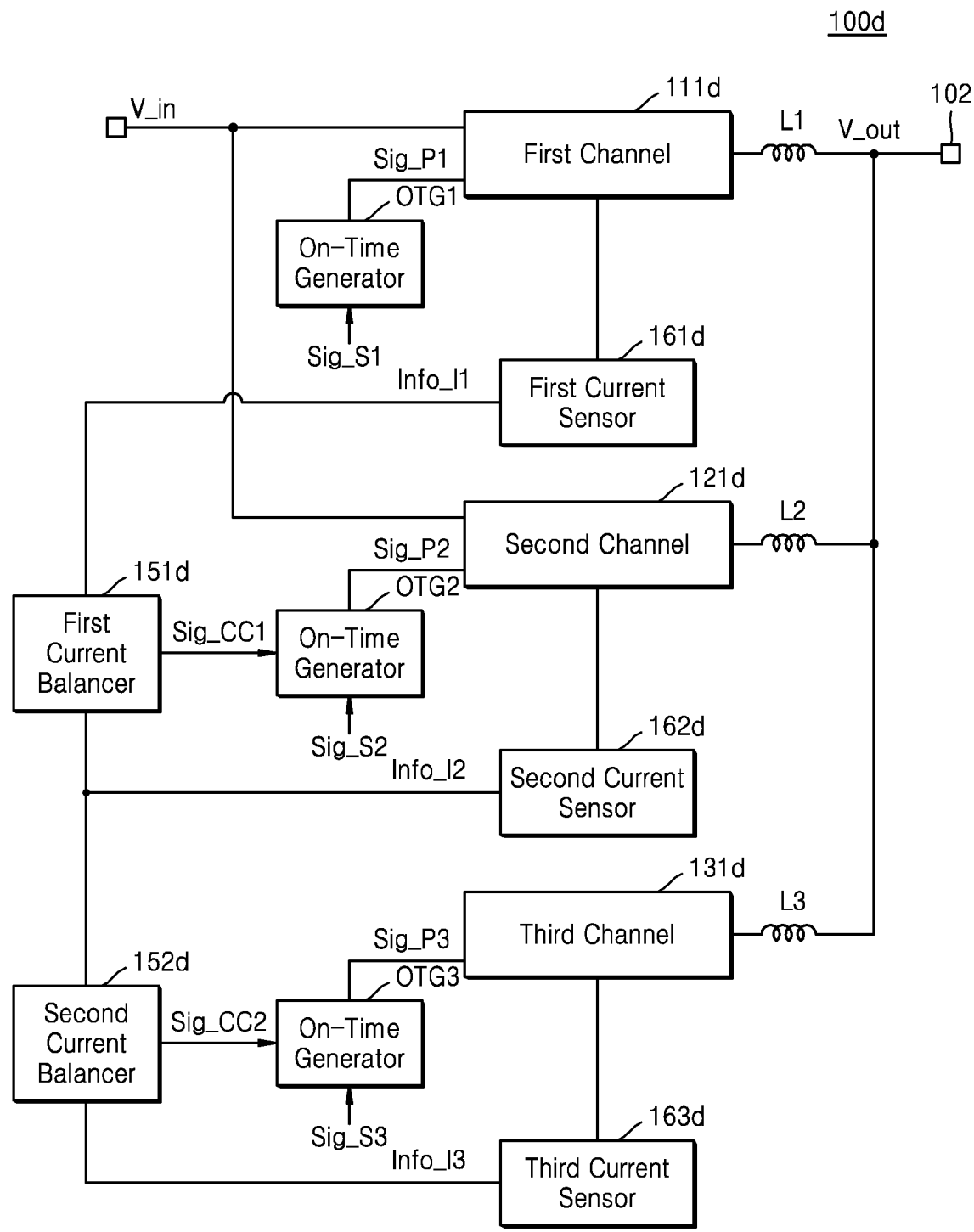
FIG. 20 is a block diagram illustrating an example embodiment of a switching regulator.

FIG. 20 is a block diagram illustrating an example embodiment of a switching regulator. In particular, FIG. 20 illustrates an embodiment in which a third current balancer generates a current control signal based on second current information. Repeated descriptions given with reference to FIG. 19 will be omitted.

Referring to FIG. 20, a switching regulator 100d may include a first channel 111d, the first on-time generator OTG1, a first current sensor 161d, a second channel 121d, the second on-time generator OTG2, a second current sensor 162d, a third channel 131d, the third on-time generator OTG3, a third current sensor 163d, the plurality of inductors L1, L2, and L3, a first current balancer 151d, and a second current balancer 152d.

Second current balancer 152d may generate the second current control signal Sig_CC2 based on the second current information Info_I2 received from second current sensor 162d and the third current information Info_I3 received from third current sensor 163d, and the third on-time generator OTG3 may adjust the third power input signal Sig_P3 based on the second current control signal Sig_CC2.

Figure 21:
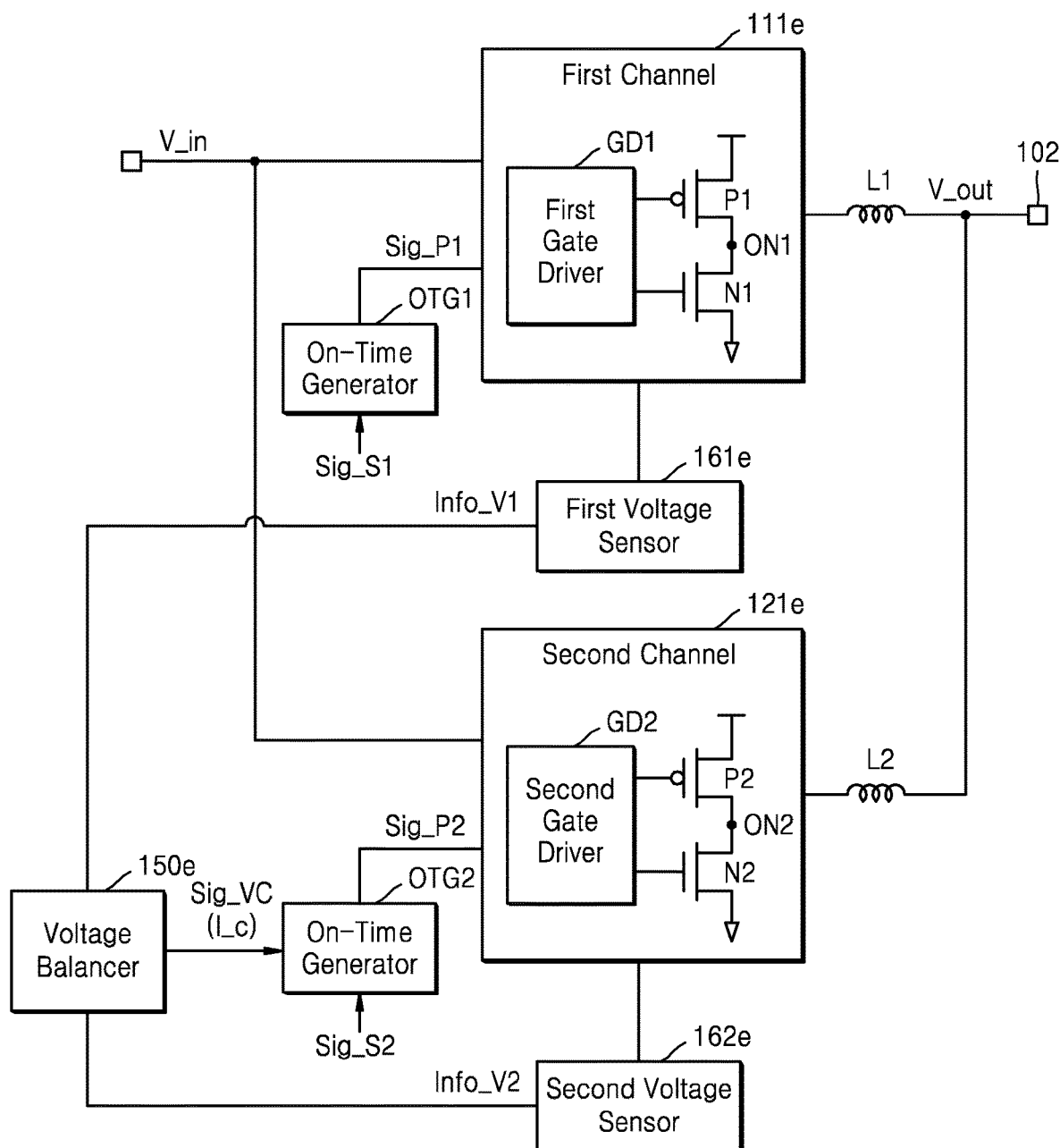
FIG. 21 is a block diagram illustrating an example embodiment of a switching regulator.

FIG. 21 is a block diagram illustrating an example embodiment of a switching regulator. In particular, FIG. 21 illustrates a switching regulator controlling a second power input signal based on a voltage. Repeated descriptions given with reference to FIG. 9 will be omitted.

Referring to FIG. 21, a switching regulator 100e may include a first channel 111e, the first on-time generator OTG1, a first voltage sensor 161e, a second channel 121e, the second on-time generator OTG2, a second voltage sensor 162e, the plurality of inductors L1 and L2, and a voltage balancer 150e. First channel 111e may include the first gate driver GD1 and the plurality of first transistors P1 and N1, and second channel 121e may include the second gate driver GD2 and the plurality of second transistors P2 and N2.

First voltage sensor 161e may sense a voltage of a specific node of first channel 111e. In one embodiment, first voltage sensor 161e may sense a first voltage of the first output node ON1 to which the first PMOS transistor P1 and the first NMOS transistor N1 are connected. First voltage sensor 161e may output, to voltage balancer 150e, first voltage information Info_V generated thereby as a result of sensing the first voltage.

Second voltage sensor 162e may sense a voltage of a specific node of second channel 121e. In one embodiment, second voltage sensor 162e may sense a second voltage of the second output node ON2 to which the second PMOS transistor P2 and the second NMOS transistor N2 are connected. Second voltage sensor 162e may output, to voltage balancer 150e, second voltage information Info_V2 generated thereby as a result of sensing the second voltage.

Voltage balancer 150e may output a voltage control signal Sig_VC based on the first voltage information Info_V and the second voltage information Info_V2. In one embodiment, voltage balancer 150e may generate a control voltage V_c based on a difference between the first voltage and the second voltage. The second on-time generator OTG2 may receive the voltage control signal Sig_VC and may output the second power input signal Sig_P2 to second channel 121e based thereon. In one embodiment, the second on-time generator OTG2 may adjust the logic high period of the second power input signal Sig_P2 based on the voltage control signal Sig_VC. As the logic high period of the second power input signal Sig_P2 is adjusted, the voltage levels of the first sub-output voltage V_1 and the second sub-output voltage V_2 may be maintained equal to each other.

Figure 22:
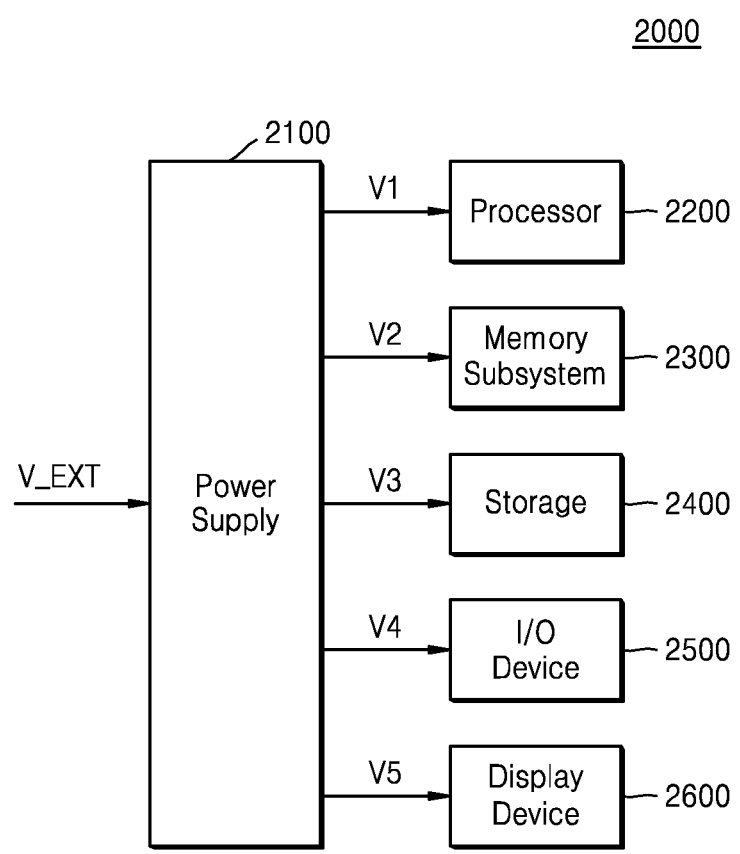
FIG. 22 is a block diagram illustrating an example embodiment of a system including a switching regulator.

FIG. 22 is a block diagram illustrating an example embodiment of a system including a switching regulator.

Referring to FIG. 22, a system 2000 may include a power supply 2100, a processor 2200, a memory subsystem 2300, storage 2400, input/output (I/O) devices 2500, and a display device 2600.

Processor 2200 may perform specific calculations or tasks. For example, the processor 2200 may be a microprocessor, a CPU, or the like. Processor 2200 may communicate with other components of system 2000 via a bus. Memory subsystem 2300 and storage 2400 may store data needed for operations of system 2000. For example, memory subsystem 2300 may include a volatile memory device such as DRAM, SRAM, or mobile DRAM or a non-volatile memory device such as flash memory, EEPROM, PRAM, MRAM, or FRAM.

Storage 2400 may include a non-volatile memory device or a storage medium such as a solid state drive (SSD), a hard disk drive (HDD), or CD-ROM. I/O devices 2500 may include an input unit such as a keyboard, a keypad, a touch pad, a touch screen, or a mouse and may also include an output unit such as a speaker or a printer. Display device 2600 may include a liquid crystal display (LCD) device, an organic light emitting display (OLED) device, or the like.

Power supply 2100 may generate power supply voltages V1 to V5 based on an external voltage V_EXT and may supply the power supply voltages V1 to V5 to the other components of system 2000, that is, processor 2200, memory subsystem 2300, storage 2400, I/O devices 2500, and display device 2600. For example, system 2000 may include a battery, and a voltage supplied to power supply 2100 may be a voltage supplied by the battery. Alternatively, as another example, system 2000 may be supplied with power from outside thereof via a power line, and the external voltage V_EXT may be a voltage generated from the power supplied via the power line. That is, the external voltage V_EXT may be a voltage of the power line or a DC voltage generated by rectifying an alternating current (AC) voltage supplied from the power line.

Power supply 2100 may include a switching regulator according to an example embodiment, the switching regulator generating at least one of the power supply voltages V1 to V5. That is, the switching regulator included in power supply 2100 may include an interleaving circuit that outputs a plurality of set signals for sub-output voltages having multiple phases, and since the plurality of set signals are collectively managed by the interleaving circuit, phase differences between a plurality of sub-output voltages may be maintained constant over time.

In addition, the switching regulator included in power supply 2100 adaptively adjusts a logic high maintaining period of a power input signal based on a plurality of pieces of current information, whereby a difference in peak voltage between the sub-output voltages may be reduced, and respective voltage levels of the power supply voltages V1 to V5 may be stably maintained.

While the inventive concept has been particularly shown and described with reference to embodiments thereof, it will be understood by those skilled in the art that various changes in form and details may be made therein without departing from the spirit and scope of the following claims. In addition, it should be understood that particular terms used herein are only for the purpose of describing the embodiments and are not intended to limit the inventive concept. Therefore, the scope of the inventive concept should be defined by the accompanying claims and equivalents thereof.

What is claimed is:

1. A multi-phase switching regulator, comprising:
    a first regulating circuit configured to receive an input voltage and to output a first sub-output voltage with a first phase to a first output node by transforming the input voltage;
    a second regulating circuit configured to receive the input voltage and to output a second sub-output voltage with a second phase to a second output node by transforming the input voltage;
    a first current sensor configured to sense a first current flowing in the first output node;
    a second current sensor configured to sense a second current flowing in the second output node; and
    a current balancer configured to receive the first current and the second current and to output a current control signal to the second regulating circuit based on a first sensing value of the first current and a second sensing value of the second current, and
    wherein the second regulating circuit adjusts a second current level of the second current to be equal to a first current level of the first current based on the current control signal.

2. The multi-phase switching regulator according to claim 1, wherein the current balancer comprises:
    a first sampler configured to generate a first current signal by sampling the first current;
    a second sampler configured to generate a second current signal by sampling the second current;
    a first filter configured to filter the first current signal;
    a second filter configured to filter the second current signal; and
    an amplifier configured to generate the current control signal by comparing a filtered first current signal with a filtered second current signal.

3. The multi-phase switching regulator according to claim 1, wherein the current balancer comprises:
    a first sampler configured to generate a first current signal by sampling the first current;
    a second sampler configured to generate a second current signal by sampling the second current;
    a first filter configured to filter the first current signal;
    a second filter configured to filter the second current signal;
    a comparator configured to generate a current comparison signal by comparing a filtered first current signal with a filtered second current signal;
    a counter configured to output a current raising signal or a current sinking signal based on the current comparison signal; and
    at least one current source configured to adjust the current control signal based on the current raising signal or the current sinking signal.

4. The multi-phase switching regulator according to claim 1, further comprising:
    an interleaving circuit configured to generate repeatedly and sequentially a first set signal and a second set signal by comparing a reference voltage with an output voltage generated based on the first sub-output voltage and the second sub-output voltage and by repeatedly and alternately emitting a first signal to generate the first set signal when the output voltage declines to the reference voltage and a second signal to generate the second set signal when the output voltage next declines to the reference voltage, and to provide the first set signal to the first regulating circuit and to provide the second set signal to the second regulating circuit,
    wherein the first regulating circuit transforms the input voltage in response to the first set signal, and
    wherein the second regulating circuit transforms the input voltage in response to the second set signal.

5. The multi-phase switching regulator according to claim 4, wherein the interleaving circuit comprises:
    a comparator configured to compare the reference voltage with the output voltage and to output a count signal when the output voltage reaches the reference voltage; and
    a counter configured to receive the count signal and repeatedly and sequentially to output the first set signal and the second set signal based on a number of times the count signal is received.

6. The multi-phase switching regulator according to claim 4, wherein the first regulating circuit comprises:
    a first on-time generator configured to output a first power input signal based on the first set signal; and
    a first channel configured to output the first sub-output voltage to the first output node in response to the first power input signal,
    wherein the second regulating circuit comprises:
    a second on-time generator configured to output a second power input signal based on the second set signal; and
    a second channel configured to output the second sub-output voltage to the second output node in response to the second power input signal, and
    wherein the second on-time generator adjusts a duty ratio of the second power input signal based on the current control signal.

7. The multi-phase switching regulator according to claim 6, wherein the second on-time generator comprises:
    a ramp voltage generating circuit configured to generate a ramp voltage;
    a ramp voltage comparator configured to compare a comparison voltage with the ramp voltage and to output a comparison result; and a latch configured to output the second power input signal based on the comparison result and the second set signal, and wherein the comparison voltage is adjusted based on the current control signal.

8. A multi-phase switching regulator, comprising:
a first regulating circuit configured to receive an input voltage and to output a first sub-output voltage with a first phase to a first output node by transforming the input voltage;
a second regulating circuit configured to receive the input voltage and to output a second sub-output voltage with a second phase to a second output node by transforming the input voltage;
a third regulating circuit configured to receive the input voltage and to output a third sub-output voltage with a third phase to a third output node by transforming the input voltage;
a first current sensor configured to sense a first current flowing in the first output node;
a second current sensor configured to sense a second current flowing in the second output node;
a third current sensor configured to sense a third current flowing in the third output node;
a first current balancer configured to receive a current selected among the first to third current and to receive the second current and to output a first current control signal to the second regulating circuit based on a reference sensing value of a selected current and a second sensing value of the second current, and
a second current balancer configured to receive the current and the third current and to output a second current control signal to the third regulating circuit based on the reference sensing value and a third sensing value of the third current,
wherein the second regulating circuit adjusts a second current level of the second current to be equal to a select current level of the selected current based on the first current control signal, and
wherein the third regulating circuit adjusts a third current level of the third current to be equal to the select current level based on the second current control signal.

9. The multi-phase switching regulator according to claim 8, wherein the first current balancer comprises:
a first sampler configured to generate a first current signal by sampling the first current;
a second sampler configured to generate a second current signal by sampling the second current;
a first filter configured to filter the first current signal;
a second filter configured to filter the second current signal; and
an amplifier configured to generate the first current control signal by comparing a filtered first current signal with a filtered second current signal.

10. The multi-phase switching regulator according to claim 9, wherein the selected current is the first current, and wherein the second current balancer comprises:
a third sampler configured to generate a third current signal by sampling the first current;
a forth sampler configured to generate a forth current signal by sampling the third current;
a third filter configured to filter the third current signal;
a forth filter configured to filter the forth current signal; and
an amplifier configured to generate the second current control signal by comparing a filtered third current signal with a filtered forth current signal.

11. The multi-phase switching regulator according to claim 9, wherein the selected current is the second current, and
wherein the second current balancer comprises:
a third sampler configured to generate a third current signal by sampling the second current;
a forth sampler configured to generate a forth current signal by sampling the third current;
a third filter configured to filter the third current signal;
a forth filter configured to filter the forth current signal; and
an amplifier configured to generate the second current control signal by comparing a filtered third current signal with a filtered forth current signal.

12. The multi-phase switching regulator according to claim 8, wherein the first current balancer comprises:
a first sampler configured to generate a first current signal by sampling the first current;
a second sampler configured to generate a second current signal by sampling the second current;
a first filter configured to filter the first current signal;
a second filter configured to filter the second current signal;
a first comparator configured to generate a first current comparison signal by comparing a filtered first current signal with a filtered second current signal;
a first counter configured to output a first current raising signal or a first current sinking signal based on the first current comparison signal; and
at least one first current source configured to adjust the first current control signal based on the first current raising signal or the first current sinking signal.

13. The multi-phase switching regulator according to claim 12, wherein the selected current is the first current, and wherein the second current balancer comprises:
a third sampler configured to generate a third current signal by sampling the first current;
a forth sampler configured to generate a forth current signal by sampling the third current;
a third filter configured to filter the third current signal;
a forth filter configured to filter the forth current signal; and
a second comparator configured to generate a second current comparison signal by comparing a filtered third current signal with a filtered forth current signal;
a second counter configured to output a second current raising signal or a second current sinking signal based on the second current comparison signal; and
at least one second current source configured to adjust the second current control signal based on the second current raising signal or the second current sinking signal.

14. The multi-phase switching regulator according to claim 12, wherein the selected current is the second current, and
wherein the second current balancer comprises:
a third sampler configured to generate a third current signal by sampling the second current;
a forth sampler configured to generate a forth current signal by sampling the third current;
a third filter configured to filter the third current signal;
a forth filter configured to filter the forth current signal; and
a second comparator configured to generate a second current comparison signal by comparing a filtered third current signal with a filtered forth current signal;

a second counter configured to output a second current raising signal or a second current sinking signal based on the second current comparison signal; and at least one second current source configured to adjust the second current control signal based on the second current raising signal or the second current sinking signal.

15. The multi-phase switching regulator according to claim 8, further comprising:

an interleaving circuit configured to generate repeatedly and sequentially a first set signal, a second set signal, and a third set signal by comparing a reference voltage with an output voltage generated based on the first to third sub-output voltage, wherein the first regulating circuit comprises:

a first on-time generator configured to output a first power input signal based on the first set signal; and a first channel configured to output the first sub-output voltage to the first output node in response to the first power input signal, wherein the second regulating circuit comprises:

a second on-time generator configured to output a second power input signal based on the second set signal; and a second channel configured to output the second sub-output voltage to the second output node in response to the second power input signal, wherein the third regulating circuit comprises:

a third on-time generator configured to output a third power input signal based on the third set signal; and a third channel configured to output the third sub-output voltage to the third output node in response to the third power input signal, wherein the second on-time generator adjusts a duty ratio of the second power input signal based on the first current control signal, and wherein the third on-time generator adjusts a duty ratio of the third power input signal based on the second current control signal.

16. The multi-phase switching regulator according to claim 15, wherein the second on-time generator comprises:

a first ramp voltage generating circuit configured to generate a first ramp voltage;

a first ramp voltage comparator configured to compare a first comparison voltage with the first ramp voltage and to output a first comparison result; and a first latch configured to output the second power input signal based on the first comparison result and the second set signal, wherein the third on-time generator comprises:

a second ramp voltage generating circuit configured to generate a second ramp voltage;

a second ramp voltage comparator configured to compare a second comparison voltage with the second ramp voltage and to output a second comparison result; and a second latch configured to output the third power input signal based on the second comparison result and the third set signal, wherein the first comparison voltage is adjusted based on the first current control signal, and wherein the second comparison voltage is adjusted based on the second current control signal.

17. A multi-phase switching regulator, comprising:

a first regulating circuit configured to receive an input voltage and to generate a first sub-output voltage with a first phase by transforming the input voltage;

a second regulating circuit configured to receive the input voltage and to generate a second sub-output voltage with a second phase by transforming the input voltage;

a first voltage sensor configured to sense the first sub-output voltage;

a second voltage sensor configured to sense the second sub-output voltage; and a voltage balancer configured to output a voltage control signal to the second regulating circuit based on a first sensing value of the first sub-output voltage and a second sensing value of the second sub-output voltage, and wherein the second regulating circuit adjusts a voltage level of the second sub-output voltage to be equal to a voltage level of the first sub-output voltage based on the voltage control signal.

18. The multi-phase switching regulator according to claim 17, further comprising:

an interleaving circuit configured to generate repeatedly and sequentially a first set signal and a second set signal by comparing a reference voltage with an output voltage generated based on the first sub-output voltage and the second sub-output voltage, wherein the first regulating circuit transforms the input voltage in response to the first set signal, and wherein the second regulating circuit transforms the input voltage in response to the second set signal.

19. The multi-phase switching regulator according to claim 18, wherein the first regulating circuit comprises:

a first on-time generator configured to output a first power input signal based on the first set signal; and a first channel configured to output the first sub-output voltage to a first output node in response to the first power input signal, wherein the second regulating circuit comprises:

a second on-time generator configured to output a second power input signal based on the second set signal; and a second channel configured to output the second sub-output voltage to a second output node in response to the second power input signal, and wherein the second on-time generator adjusts a duty ratio of the second power input signal based on the voltage control signal.

20. The multi-phase switching regulator according to claim 19, wherein the second on-time generator comprises:

a ramp voltage generating circuit configured to generate a ramp voltage;

a ramp voltage comparator configured to compare a comparison voltage with the ramp voltage and to output a comparison result; and a latch configured to output the second power input signal based on the comparison result and the second set signal, and wherein the comparison voltage is adjusted based on the voltage control signal.

* * * * *